United States Patent
Averi et al.

(10) Patent No.: US 9,100,338 B2
(45) Date of Patent: Aug. 4, 2015

(54) FLOW-BASED ADAPTIVE PRIVATE NETWORK WITH MULTIPLE WAN-PATHS

(71) Applicants: John Earnest Averi, Cary, NC (US); Stephen Craig Connors, Jr., Sunnyvale, CA (US); John Edward Dickey, Apex, NC (US); Andrew Joshua Gottlieb, Cupertino, CA (US)

(72) Inventors: John Earnest Averi, Cary, NC (US); Stephen Craig Connors, Jr., Sunnyvale, CA (US); John Edward Dickey, Apex, NC (US); Andrew Joshua Gottlieb, Cupertino, CA (US)

(73) Assignee: Talari Networks Incorporated, Cupertino, CA (US)

( * ) Notice: Subject to any disclaimer, the term of this patent is extended or adjusted under 35 U.S.C. 154(b) by 0 days.

(21) Appl. No.: 14/146,786

(22) Filed: Jan. 3, 2014

(65) Prior Publication Data
US 2014/0185445 A1 Jul. 3, 2014

Related U.S. Application Data

(60) Division of application No. 13/592,460, filed on Aug. 23, 2012, now Pat. No. 8,644,164, which is a
(Continued)

(51) Int. Cl.
| | |
|---|---|
| H04L 12/863 | (2013.01) |
| H04L 12/701 | (2013.01) |
| H04L 12/721 | (2013.01) |
| H04L 12/729 | (2013.01) |
| H04L 12/707 | (2013.01) |
| H04L 12/725 | (2013.01) |
| H04L 12/717 | (2013.01) |
| H04L 12/803 | (2013.01) |

(52) U.S. Cl.
CPC ............... *H04L 47/50* (2013.01); *H04L 45/00* (2013.01); *H04L 45/123* (2013.01); *H04L 45/125* (2013.01); *H04L 45/24* (2013.01); *H04L 45/26* (2013.01); *H04L 45/302* (2013.01); *H04L 45/42* (2013.01); *H04L 47/125* (2013.01)

(58) Field of Classification Search
None
See application file for complete search history.

(56) References Cited

U.S. PATENT DOCUMENTS

| | | | | |
|---|---|---|---|---|
| 6,247,061 B1 * | 6/2001 | Douceur et al. | ............... | 709/240 |
| 7,551,623 B1 * | 6/2009 | Feroz et al. | ............... | 370/395.21 |

(Continued)

*Primary Examiner* — Kerri Rose
(74) *Attorney, Agent, or Firm* — Law Offices of Peter H. Priest, PLLC

(57) ABSTRACT

Systems and techniques are described which improve performance, reliability, and predictability of networks without having costly hardware upgrades or replacement of existing network equipment. An adaptive communication controller provides WAN performance and utilization measurements to another network node over multiple parallel communication paths across disparate asymmetric networks which vary in behavior frequently over time. An egress processor module receives communication path quality reports and tagged path packet data and generates accurate arrival times, send times, sequence numbers and unutilized byte counts for the tagged packets. A control module generates path quality reports describing performance of the multiple parallel communication paths based on the received information and generates heartbeat packets for transmission on the multiple parallel communication paths if no other tagged data has been received in a predetermined period of time to ensure performance is continually monitored. An ingress processor module transmits the generated path quality reports and heartbeat packets.

20 Claims, 19 Drawing Sheets

Related U.S. Application Data continuation of application No. 13/353,693, filed on Jan. 19, 2012, now Pat. No. 8,274,891, and a continuation-in-part of application No. 12/482,766, filed on Jun. 11, 2009, now Pat. No. 8,125,907.

(60) Provisional application No. 61/060,846, filed on Jun. 12, 2008.

(56) References Cited

U.S. PATENT DOCUMENTS

| | | |
|---|---|---|
| 2004/0052304 A1* | 3/2004 | Reial .............................. 375/148 |
| 2009/0080451 A1* | 3/2009 | Gogic ........................... 370/412 |

\* cited by examiner

FLOW-BASED ADAPTIVE PRIVATE NETWORK WITH MULTIPLE WAN-PATHS

CROSS REFERENCE TO RELATED APPLICATION

This application is a divisional of U.S. patent application Ser. No. 13/592,460 filed on Aug. 23, 2012 which is a continuation of U.S. patent application Ser. No. 13/353,693 filed on Jan. 19, 2012 which issued as U.S. Pat. No. 8,274,891 which claims the benefit of and priority to U.S. patent application Ser. No. 12/482,766 filed on Jun. 11, 2009 which issued as U.S. Pat. No. 8,125,907 on Feb. 8, 2012 and claims the benefit of U.S. Provisional Patent Application No. 61/060,846 entitled "Flow-Based Adaptive Private Network With Multiple WAN-Paths", filed on Jun. 12, 2008 which is hereby incorporated by reference in its entirety.

FIELD OF THE INVENTION

The present invention relates generally to improved network communication. More specifically, the present invention relates to systems and methods for effectively managing network communication employing multiple paths between sites.

BACKGROUND OF THE INVENTION

The introduction of frame relay in the early 1990's brought lower cost, higher bandwidth, improved reliability, and simpler management control to enterprise wide area networks (WANs) as compared to X.25 and point-to-point leased-line alternatives. Frame relay, together with single-source asynchronous transfer mode (ATM) and multiprotocol label switching (MPLS) services, still dominate the enterprise WAN market for corporate Internet traffic. A customer installs one of these networks and pays a single carrier a fee associated with the reliability and bandwidth the particular network provides. For example, a network may be advertized to provide "3 and ½ nines" (99.95%) or better reliability and have a fee based on this reliability and a cost-per-mega-bytes-per-second (Mbps). The present cost for such a network is almost as high as the fee paid back in 1998.

While performance, reliability, and predictability of a network has improved due to improvements in processor and communication architectures and implementations, these characteristics of a single network purchased from a single network provider are considered relatively low and costly. Also, load balancing is still a difficult process due to the dynamic nature of networks.

SUMMARY OF THE INVENTION

Among its several aspects, the present invention addresses systems and techniques which improve performance, reliability, and predictability of networks without having costly hardware upgrades or replacement of existing network equipment. To such ends, an embodiment of the invention addresses an adaptive communication controller for providing wide area network (WAN) performance and utilization measurements to another network node over multiple parallel communication paths across disparate asymmetric networks which vary in behavior frequently over time. An egress processor module receives a first set of communication path quality reports and tagged path packet data from a peer node and generates accurate arrival times, send times, sequence numbers and unutilized byte counts for the tagged packets received from the peer node. A control module generates a second set of communication path quality reports describing performance of the multiple parallel communication paths based on the first set of communication path quality reports and the tagged path packet data received from the peer node and generates heartbeat packets for transmission on the multiple parallel communication paths if no other tagged data has been received in a predetermined period of time to ensure performance is continually monitored. An ingress processor module transmits the second set of communication path quality reports and heartbeat packets to the peer node, wherein each transmitted packet is tagged with a send time, sequence number, and unutilized byte count.

Another embodiment addresses a method of adapting the selection of communication paths in a multiple parallel path network having disparate communication paths between a transmitting network node and a receiving network node utilizing disparate WAN links. A traffic flow comprising a plurality of data packets is received for transmission. Performance characteristics of communication paths available for transmitting a first set of data packets in parallel are evaluated. Multiple communication paths are selected in response to the evaluated performance characteristics as the best communication paths available for transmitting the first set of data packets in parallel. Each data packet of the first set of data packets is tagged with a path sequence number, flow sequence number, and time stamp. Data packets of the first set of data packets are transmitted in parallel to the receiving network node over the selected multiple communication paths.

Another embodiment addresses an adaptive communication controller for providing wide area network (WAN) performance and utilization measurements to another network node over multiple parallel communication paths across disparate asymmetric networks which vary in behavior frequently over time. An egress processor module maintains long duration histories of individual packet successful and unsuccessful communication and pending packet lists for reassembly and re-sequencing for flow tagged packets received from a peer node. A control module maintains a data store of peer node path performance characterizations for packet loss, one way communication time, jitter on one way communication time, congestion, and bandwidth allocation. An ingress processor module serially sequences packets within a communication session for fragmentation and session order and transmits packets to the peer node by selecting communication paths using the peer node path performance characterizations.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1I illustrates an adaptive private networking time synchronization transaction between an adaptive private network (APN) client node and an adaptive private network control node according to the present invention;

DETAILED DESCRIPTION

The present invention is directed towards providing a flow-based, reliable, high-bandwidth network comprised of multiple paths between sites.

Figure 1A:
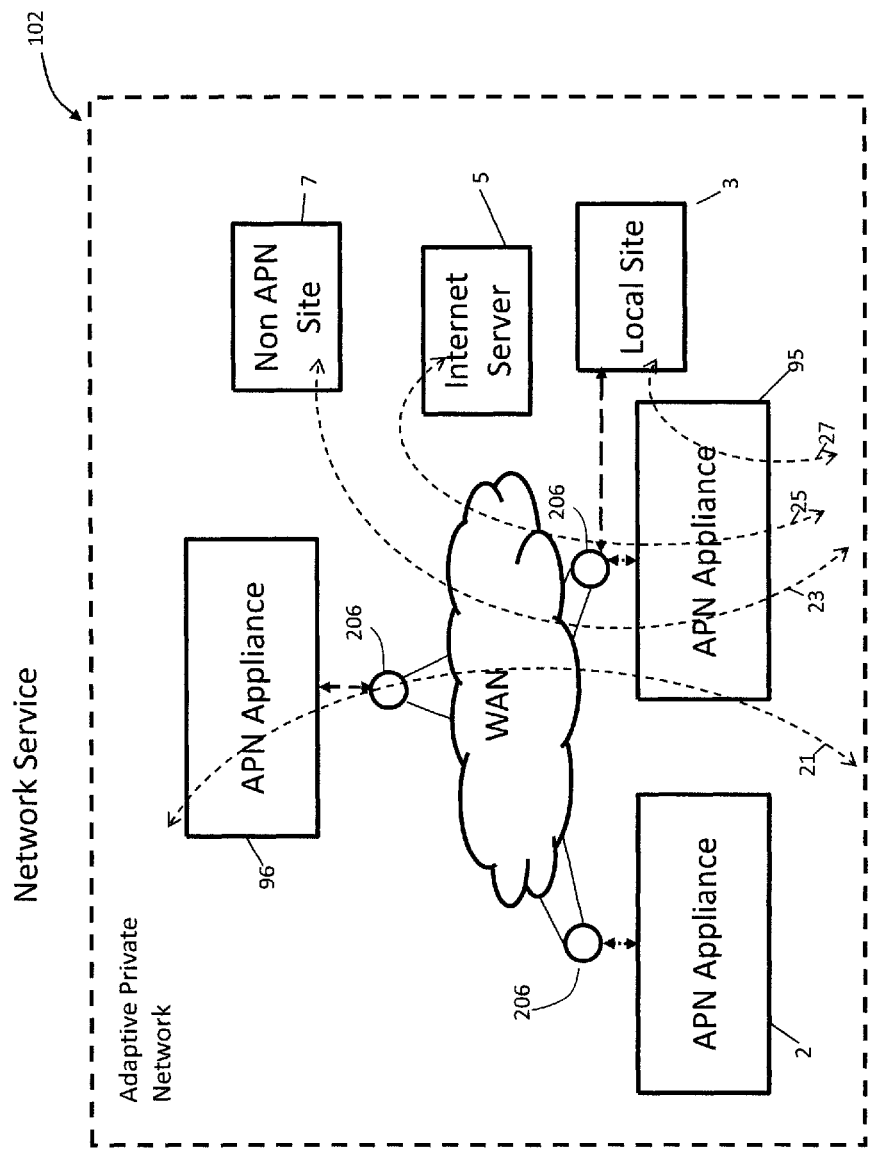
FIG. 1A illustrates APN service and an adaptive private network (APN) according to the present invention.

As illustrated in FIG. 1A, an Adaptive Private Network (APN) represents a whole network in which the present invention may be suitably employed as described in further detail below, including the network components, flows, paths, and services. The APN includes wide area networks (WANs), adaptive private network appliances (APN appliances, or APNAs) 96, 95, 2, network application services as well as APN conduits between APN appliances.

A WAN link represents a physical access point to the wide area network (WAN), such as a digital subscriber line (DSL) connection or a cable modem. The distinctive characteristic of a WAN link is the bandwidth—the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as intermediate WAN routers 206 of FIG. 1A.

A private WAN link provides a physical access point to non-public WAN destinations. Examples of such private WAN links include an ATM link with an ATM virtual circuit, a frame relay link with a frame relay circuit, an MPLS tunnel, a virtual private network (VPN) tunnel, or a leased point-to-point line. Connectivity on a network having a private WAN link is made only to the destination on the other end of the network. A public WAN link represents a physical access point to the Internet. It can be assumed that any public WAN link can establish a connection to any other public WAN link.

The APN is capable of using disparate asymmetric WAN links which vary in behavior of bandwidth, latency, jitter, packet loss and congestion frequently over time. For example, the APN can use a asymmetric DSL WAN link that transmits data at 512 kbps upstream to the WAN and 6 mbps from the WAN through the public network combined with a private symmetric leased circuit T1 WAN link that transmits data at 1544 kbps upstream and downstream and a cable broadband connection that transmits at data 312 kbps upstream to the WAN and 3 mbps from the WAN to a to a peer of adequate aggregation bandwidth of these rates for a single TCP file transfer session at theoretical rate of 2324 kbps and receive at 10544. Practically, under good network behavior the actual rate would approach 90% of these rates. If the behavior of the connection was to change, for example the paths to the DSL link were to have dramatic levels of loss, the APN would, using its high frequency performance feedback mechanism, would adapt the network to avoid or mitigate the issues by using alternative resources or attempting to recover from the loss.

An APN path is a logical connection established between two WAN links located at different geographic sites across a WAN.

An APN conduit is a virtual connection between two APN nodes, formed by aggregating multiple APN paths and their allocated WAN link resources.

An APN appliance (APNA) is an "instrument" that contains APN node functionality including all software modules within.

In a presently preferred embodiment, the APN node's software modules at a site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as a personal computer, a server, or the like having one or more central processing unit devices. The processor and memory complex, for example, may be configured to execute instructions under control of a software module program stored on a computer readable storage medium either directly associated locally with the processor and memory complex, such as may be available through an instruction cache, or accessible through an I/O device. A software module may reside in computer readable storage medium which may include random access memory (RAM) memory, flash memory, ROM memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable storage medium. A storage medium may also be coupled to the processor and memory complex such that the hardware processor can read information from, and write information to, the storage medium over an Intranet or the Internet.

Figure 1B:
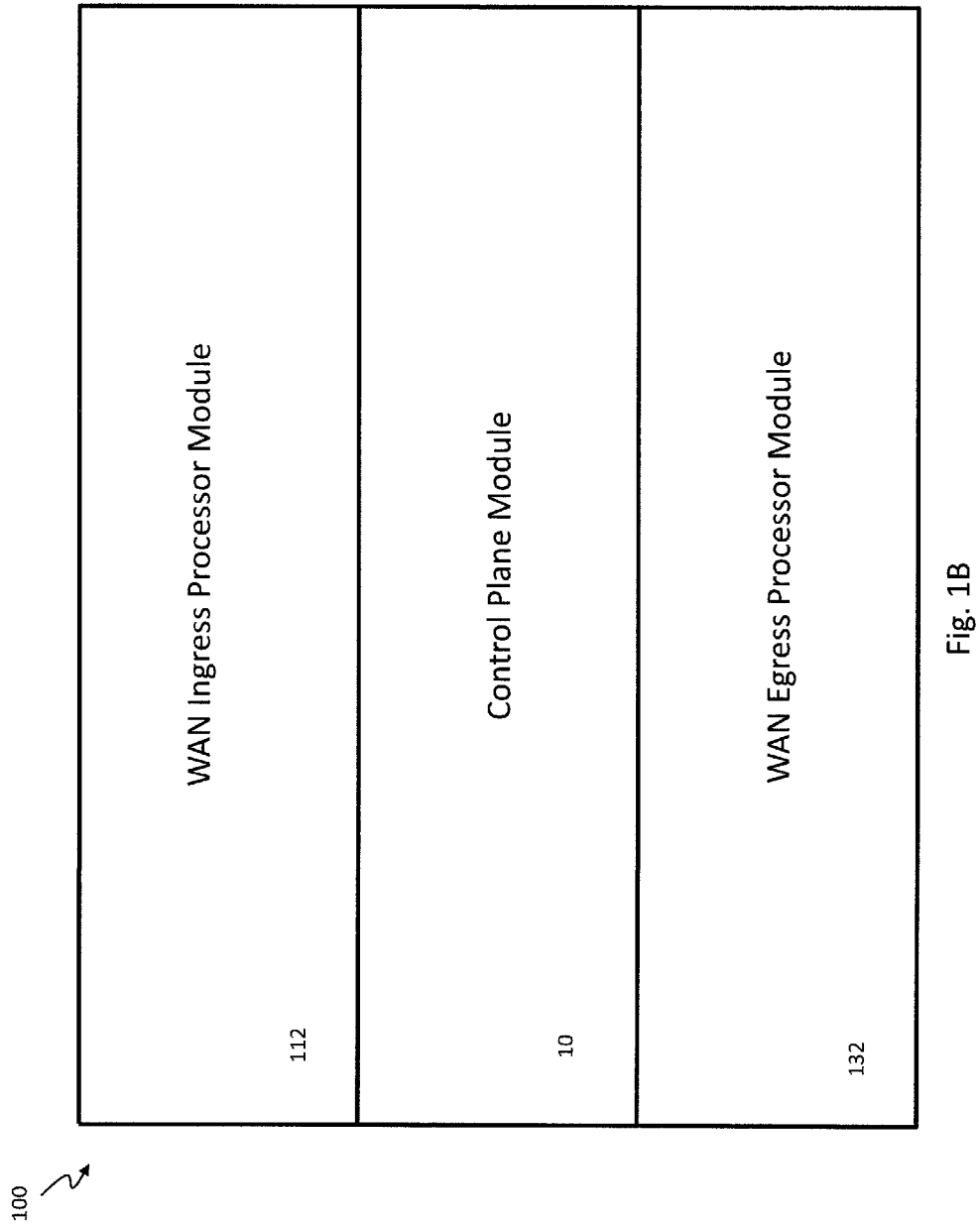
FIG. 1B illustrates APN node software modules according to the present invention.

An adaptive private network node (APN node) contains software modules required to participate in an adaptive private network. An APN node may exist in one or more APN appliances at a location. An APN node contains a collection of software modules, which govern its participation within an APN. These modules are contained within three major groups as illustrated in FIG. 1B: a control plane module 10, WAN ingress processor module 112, and a WAN egress processor module 114. The control plane module is responsible for controlling and participating in the control of the APN node in tandem with other APN nodes in the network.

The WAN ingress processor module 112 may suitably be embodied as software and hardware components responsible for processing network traffic for transmission from a local area network (LAN) to a WAN. The WAN egress processor module 114 may suitably be embodied as software operating on hardware components, such as a processor and memory complex that is responsible for processing network traffic for transmission from a WAN to a LAN. WAN ingress and WAN egress processor modules are discussed in further detail below. The APN node's control plane module 10 may suitably be embodied as software operating on hardware components, such as a processor and memory complex that utilizes the APN node's WAN ingress processor module 112 and WAN egress processor module 114 as the means for transmitting and receiving APN node to APN node control data across the WAN.

Figure 1C:
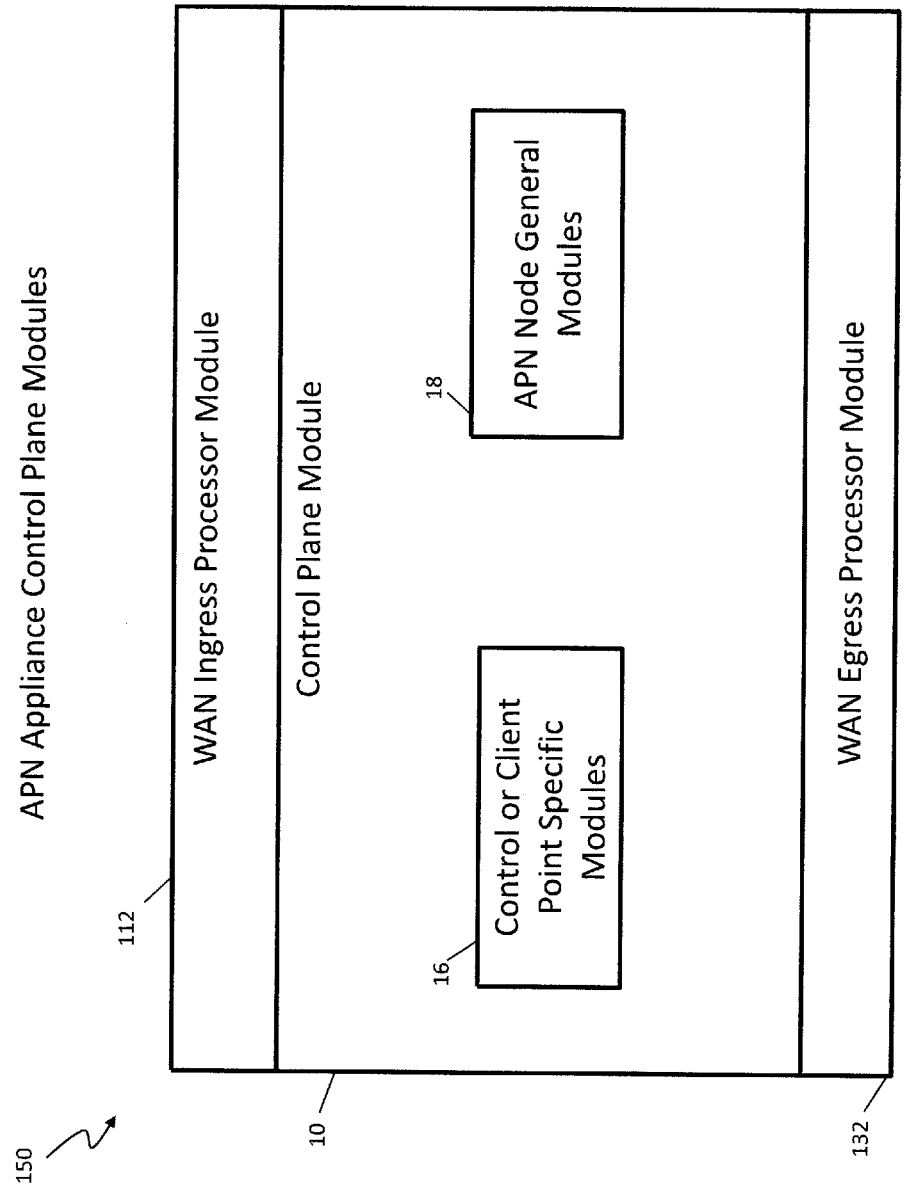
FIG. 1C illustrates adaptive private network control plane modules according to the present invention.
Figure 1D:
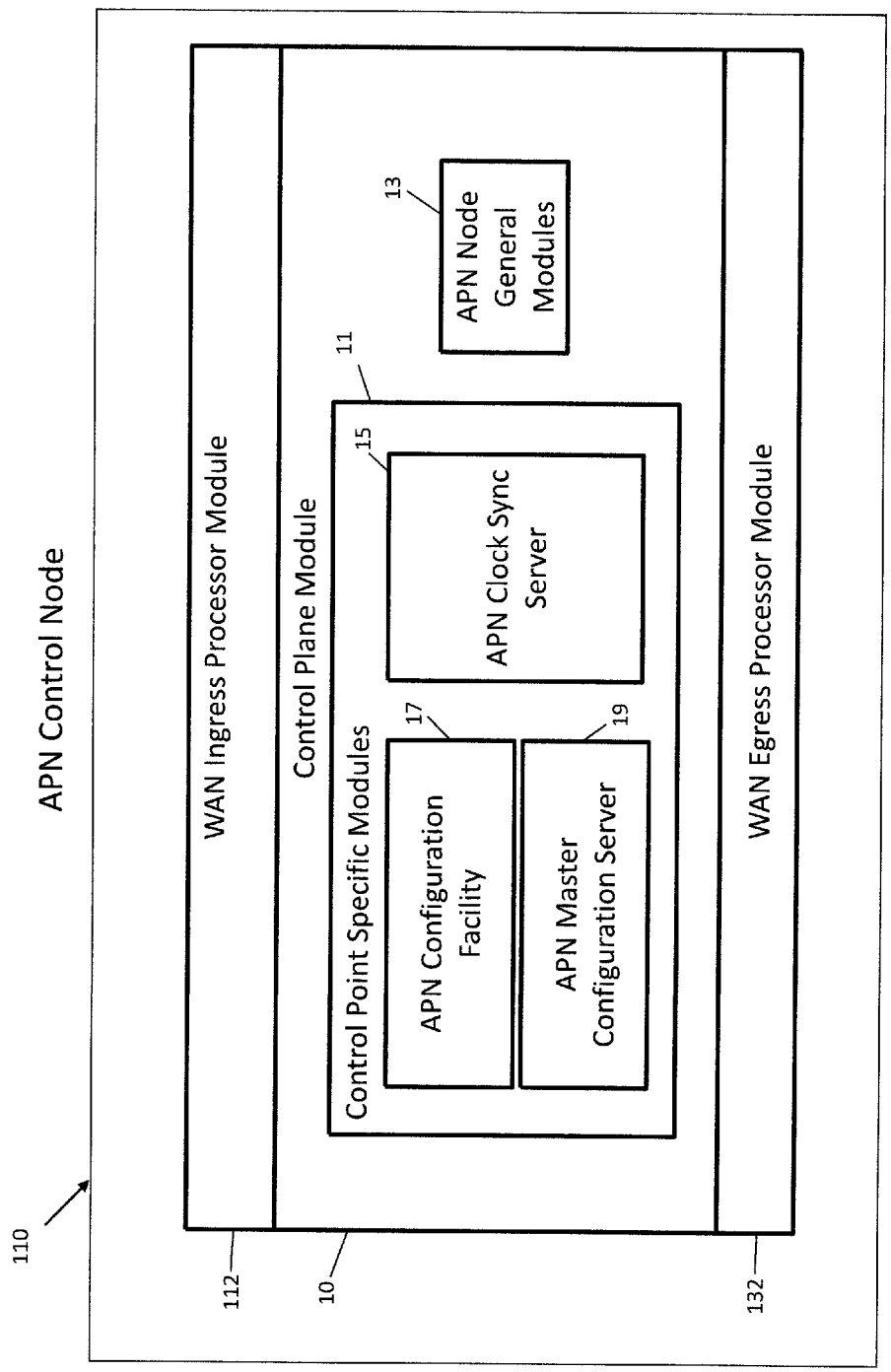
FIG. 1D illustrates an adaptive private network control node according to the present invention.
Figure 1E:
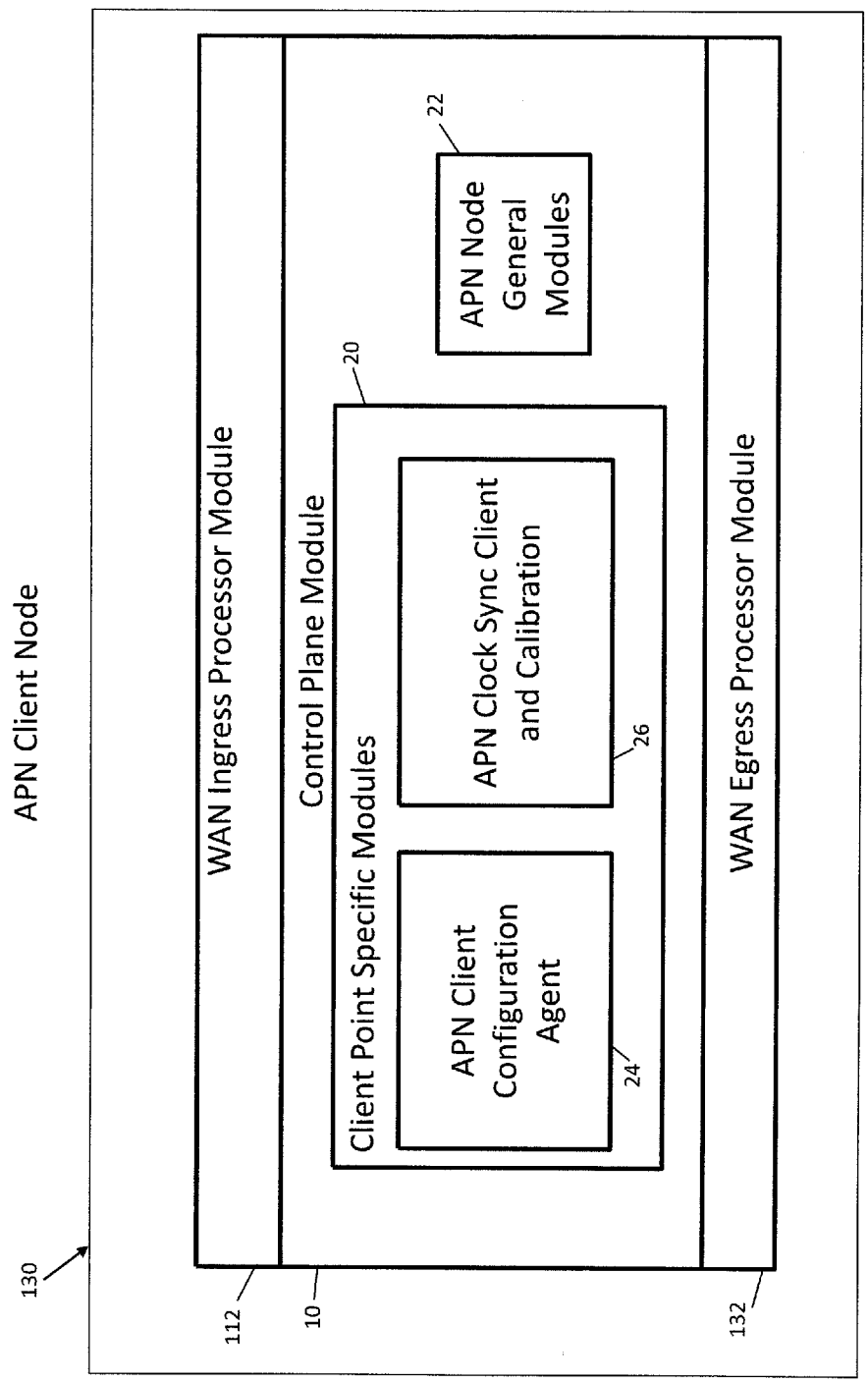
FIG. 1E illustrates an adaptive private network client node according to the present invention.

As illustrated in FIG. 1C, the control plane module 10, contains sub-modules responsible for administration and control of the APN node. The control plane module has two sub-groups of modules associated with the role the APN node is configured to play within the APN. As illustrated in FIG. 1H, the control or client-point specific modules 16 are determined by the role of the APN node within the APN. If the APN node is an APN network control node, the module will serve as the APN control point. If the APN node is an APN client, the module will serve as the APN client point. The roles and behaviors of APN control points and APN client points are explained in further detail below. All APN nodes have the common control modules 18 of FIG. 1C. These modules 18 provide services that are universal to all APN nodes.

An APN node's common control module 18 is responsible for tracking and adjusting the behavior of the APN continually. In particular, the common control module contains specific modules associated with APN paths and WAN links. As illustrated in FIG. 1H, the path state monitoring module 91 is responsible for the empirical monitoring of the APN paths' performance. The WAN link accounting module 89 is responsible for the empirical monitoring of the WAN links' performance for bandwidth, congestion, and determines dynamic allocation of WAN resources for network services utilizing the WAN links. Network services are described in further detail below.

An APN node communicates the results derived by the common control modules 18 through the use of the local APN conduit state 87, and the remote APN conduit state 85. The local APN conduit state 87 is contained in memory on the APN appliance, and is written to by the common control modules local to the APN node. When the Local APN conduit state is updated, the local APN conduit state data is transmitted to remote APN nodes with an APN quality report packet. The APN quality report is transmitted via the local APN node's WAN ingress processor module 112 and is received by the remote APN nodes' WAN egress processor module 132.

The remote APN nodes will update their remote APN conduit state with the data contained within the APN quality report. The remote APN conduit state will be referenced by the APN node's WAN ingress processor modules and WAN egress processor modules in order to determine the proper adaptive behaviors for data to be sent to or received from the WAN.

As seen in FIG. 1I, a network control point (NCP) 50 is an administration point for an APN 250. In one embodiment, the NCP 50 resides within an APN node 110. An APN control node refers to an APN node that also performs as the network control point of the APN. In another embodiment, an NCP resides in an appliance that is separate from an APN node and administers and controls the APN nodes within the APN. The NCP provides administrative and control to the APN, including but not limited to, distribution of configuration objects to APN client nodes and time synchronization to the APN. In another embodiment, multiple NCPs are provided for redundancy purposes to avoid having a single point of failure in an APN.

An APN client node 130 is an APN node that does not perform as the APN control point, but instead performs as an APN client point that works in tandem with an external APN control point for the APN node's control and administration.

One purpose of the APN control point is to establish and manage APN conduits between APN nodes across a WAN for intra-enterprise site-to-site communications. A particular APN control node may administer and have conduits to multiple APN client nodes. Typically, an APN control node is located in the data center of an enterprise. In such an embodiment, the APN control node administers conduits to and from the data center. In another embodiment, the APN control node may also administer conduits directly from APN client node to APN client node.

An APN client node is an APN node that exists remote from an APN control point. Although an NCP will potentially have multiple APN network client nodes, each APN network client node will preferably have one NCP. In one embodiment, APN client nodes will have practically no need for local administration. Generally, APN client nodes will be located at remote branch offices.

The synchronization of control information from the single APN control point of an APN to one or more APN client points is one aspect of maintaining the proper behavior of the APN in general. An APN clock and APN configuration synchronization transactions between APN control points and APN client points are transactions discussed immediately below in greater detail.

As illustrated in FIG. 1I, the master APN clock 49 is synchronized throughout all APN nodes 130 within an APN. The APN clock sync server 54 synchronizes timing throughout APN nodes, such as APN client node 130, in an APN. A hardware real time clock is contained within an APN appliance of the APN control node 110, such as appliance 96 shown in FIG. 1A. This clock is used as an APN reference clock for the APN. This reference clock is called the master APN clock. Each APN client point solicits and calibrates to the APN clock sync server 54, residing within the APN control point specific modules 50, on an APN control node 110. Each APN client node 130 also contains a hardware real time clock 61 within the client node 130's APN appliance, such as appliance 95 shown in FIG. 1A. This APN client clock 61 is referred to as the APN client clock. Preferably, the time synchronization is such that drift between the APN nodes, for example, is limited to a drift of about a few milliseconds. In a presently preferred embodiment, empirical study validates that the drift range is about 1.5 milliseconds.

The master high resolution APN master clock 49 is kept at the APN control point and each APN client point synchronizes to this clock. Each APN client node 130 sends an APN clock sync sample request message 60 to the APN control node 110 to request the current time. The request message 60 is received in the APN control node and initiates a process that responds to the request message 60 by sending the current time back to the APN client node in an APN time sync sample reply message 59. The APN client node measures the time from initiating the request, T0, to receiving the current time response, T1. An assumption is made that the travel time to send the request message 60 to the APN control node is approximately the same as the travel time for the APN control node to send the current time reply message 59 to the APN client node. Based upon this assumption, the time difference of T1-T0 is then divided by two.

The APN client node uses this timing data to adjust a network time by using a linear algebraic calculation based on the slope-intercept form. In a current implementation, y is the time at the APN control node and x is the client node local time, b is the base offset between the two, and m is the rate of change of y versus x which is the slope. Using these definitions, an equation in slope-intercept form $y=mx+b$ is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

In order to limit jitter and phase shift error, a table of time synchronization samples is kept. These tables, called time sync sample tables, are defined below. Finite impulse response filter tables for slope and base are kept as well.

In a current implementation, a table containing 128 entries is used to track time sync samples. Each time sync sample has two fields per record; the APN network time from the network control point, and the local time plus one-half RTT. With the first time sync sample, every entry in the time sync sample table is initialized with the value of the first sample of APN time and local time. Each subsequent sample entry is advanced in the table eventually rotating through all entries circularly.

The time sync sample table is then used to derive a slope sample by dividing the time deltas of the current entry in the time sync table and the last entry in the rotating table for the APN network time and the local time. The slope sample is equal to the change in APN network time divided by change in APN client local time for the duration of the table, which is the time between the current and last entry in the table. Note that this time sync table itself is not a finite impulse table, since an average sum for a sum of all the elements in the table is not used, but rather a slope between two points in time that are 126 sample entries apart is utilized. It will be recognized that different numbers of table entries and spacings may be employed, and that the example described is illustrative and not limiting.

A finite impulse response table for slope contains 64 entries. Initially, every entry in this slope table is initialized to one, meaning the rate of change of the APN network time is defaulted to the rate of change as the local time.

As slope samples are derived from the time sync sample table, actual slope entries displace the defaulted slope entries. Similar to the sample table, the slope table is a circular table where each entry advances. Each subsequent sample entry is advanced in the table eventually rotating through all entries circularly. A sum of all the slopes in the slope table is maintained using all the entries in the slope table. Each time a new entry is added, the sum is recalculated by subtracting the value of the entry removed and adding the value of the new entry.

A base sample table contains 256 entries. This table is not actually used to determine the base that will be used for APN time, but instead is used to determine the acceptability of the last time sync sample to be used for resetting the base and slope.

Each entry in the base sample table contains two fields, a value field and a period field. The value field contains a difference between the value of local time plus one-half RTT in local time and the value of APN network time. Additionally, the period field contains the time period duration between this sample time and the prior time sync sample time. This results in a table that has time span that covers the time from the first entry to the last entry. A sum is continually calculated on both the value and period fields for all entries in the table.

Once samples have been run for greater than 200 milliseconds between the first entry in the base table and the last entry in the base table, the software then begins to use the base table to determine acceptability filters. The sum of the value fields in the base table is divided by the sum of the period fields in the table. This value is the average rate of change of the base for the base table over the time period. In a current implementation, this value is adjusted for change per seconds.

The base offset in APN clock sync client and calibration module 55 is not acceptable for adjustment if each of the following is true:

1. If the absolute rate of change of the last sample is greater than the absolute value of the average rate of change for the base table plus or minus 3 times the square root of that rate of change.
2. If the period covered by the base table is greater than 1 second.
3. If the time since the last acceptable sample is less than 2 seconds.
4. If we have not received more than 4 unacceptable samples in a row, where an unacceptable sample is described in 1 above with four chosen as indicative of a pattern rather than an anomaly.

If the value is rejected but it is determined, that the rate of change is fluctuating from positive slope to negative slope, an unacceptable counter is cleared and the last good time is set to present. If the value is not rejected by the filter, then the slope and base may be updated.

The formula for updating the slope is the sum of the slope table entries divided by the number of slope table entries. The formula for updating the base is the APN network time−(client local time+½ RTT)*slope.

Figure 2:
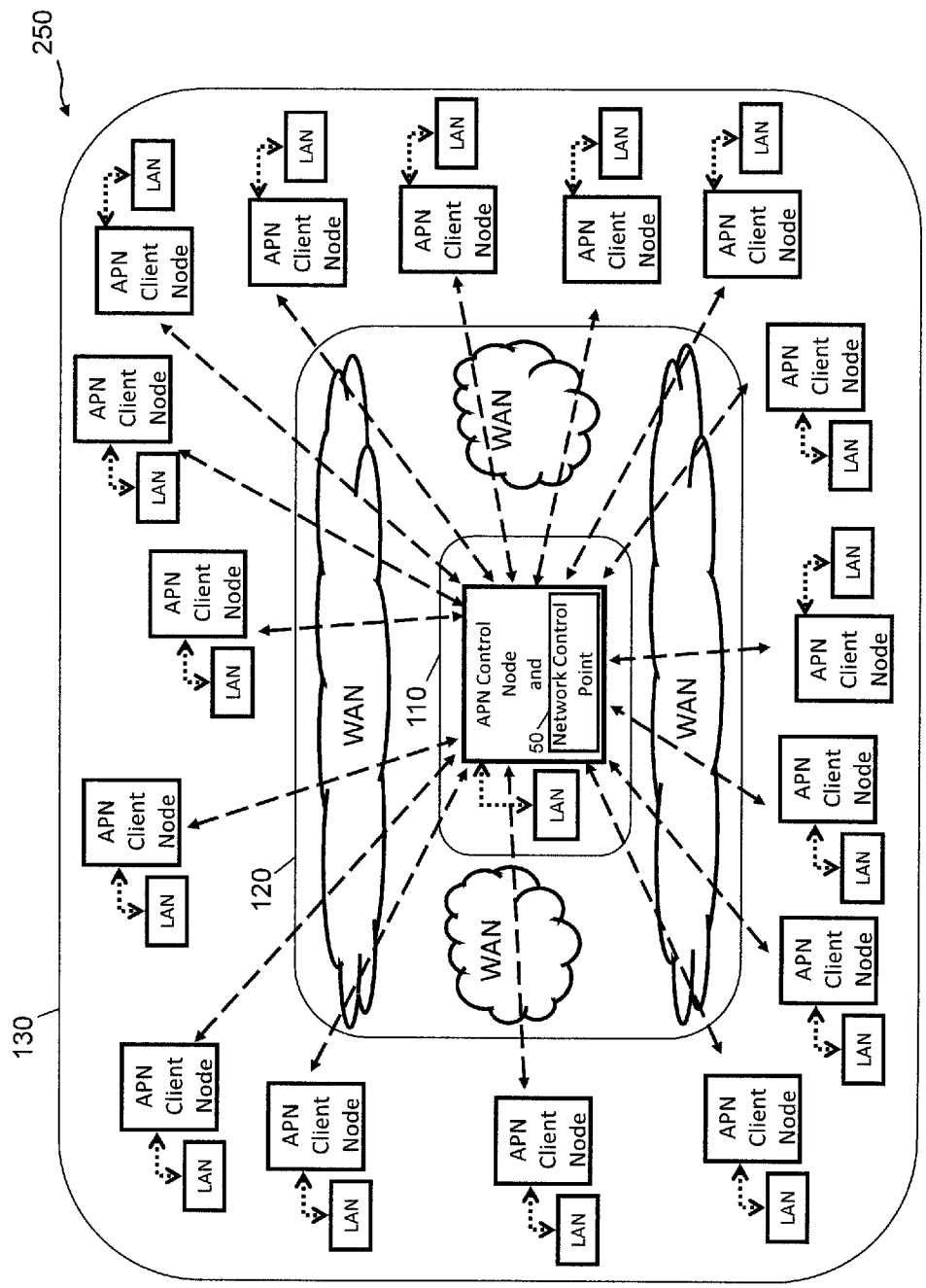
FIG. 2 illustrates a network configuration having an APN network control node (NCN) coupled through sixteen APN conduits to sixteen APN client nodes according to the present invention.

As illustrated in FIG. 2, in a presently preferred embodiment, APN 250 is centrally configured. A network administrator configures the entire APN through an APN configuration file that is processed by the network control point 50. The network control point then distributes the configuration settings to all nodes 130 in the APN. This method of configuring the APN 250 is intended to provide benefits to the administrator by providing a single point of configuration to the network. It also assures configuration consistency and compatibility for all APN nodes in the network simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a holistic mapping of the APN resources and their initial allocations. Furthermore, the centralized configuration can provide information and warnings to the administrator as to the behavior of the configuration that may not be obvious or intended from the configuration, before loading the configuration onto a production network.

There are currently four methods of updating the configuration of APN client nodes 130. Referencing FIG. 1J, an APN control point specific modules 50 may perform APN configuration push process 62, as described below, to initiate the sending of a new configuration. One of the APN client nodes 130 may send an APN configuration request 64 to the APN control point 50, requesting that an update be performed. Alternately, a new configuration may be uploaded directly through an administrative web interface console software program residing within every APN node, shown software as 46 and 48 in FIG. 1J. Additionally, a quick start version of the configuration may be used as well.

When an APN configuration push process 62 is initiated, a message is sent from an APN master configuration server 58 to an APN client configuration agent 57 to indicate that an update is coming. The APN client configuration agent 57 replies with an acknowledgment (ACK) and the APN master configuration server 58 sends a packet containing the first 1000 bytes of the configuration file to the APN client configuration agent 57. The APN client configuration agent 57 replies with an ACK that it has received the first packet, which indicates to the APN master configuration server 58 that the next packet should be sent. If 200 milliseconds (ms) have passed and the APN master configuration server 58 has not received an ACK, it will retransmit the packet. This process continues until all packets have been successfully transmitted or the APN master configuration server 58 transmits a packet ten times without receiving an ACK. 200 ms after the tenth retransmission, the APN master configuration server 58 times out and the configuration synchronization attempt is aborted.

As the APN control point 50 of FIG. 2 contains all the configuration files for the sites in the network, an update may be manually performed using these files. Through administrative interfaces, such as interfaces 46 and 48, of the APN control point 50, a file containing all configuration registries for the sites in the APN may be downloaded. This file is then uploaded through the administrative interfaces of the APN client node 130 of FIG. 2 and the appropriate site is selected, thereby saving the configuration file to the APN client node 130. The APN services on the APN client node 130 are then restarted thus bringing the APN client node configuration into synchronization.

In the case of an APN configuration request 64, the control plane module 12 of the APN client node 130 indicates that it has received an APN quality report from the APN control point 50 with a configuration version that does not match the current configuration of the APN client node 130. An APN configuration request 64 is sent to the APN master configuration server 58 which will verify that it has an updated configuration for the APN client node 130 and initiates an APN configuration push process 62 as described above. If the APN client node 130 no longer exists in the new APN configuration, the APN configuration request 64 will be ignored.

When a new APN client node, such as one of the plurality of APN client nodes 130 of FIG. 2, is added to the APN and the APN control point 50 already includes this new APN client node 130 in its configuration file, the APN client node 130 may be brought into configuration synchronization using a quick start version of the APN configuration file. This quick start configuration file is created containing only basic connectivity parameters and loaded through administrative interfaces, such as interfaces 46 and 48. Once a basic conduit has been established with the quick start configuration, an APN configuration request 64 will be sent.

An APN service is a set of processing steps performed on packets that are transmitted through the APN. As illustrated in FIG. 1A, data traffic that moves through APN 102 and APN appliance 2 may require different types of services depending on where the sending and receiving stations are located. An APN service instance is a particular configured contextual instance of an APN service held in APN appliance memory 7 internal to the APN appliance 2, for example. An APN service instance's memory contains, but is not limited to, context specific configuration data, statistic data, and tracking states data. For example, an APN node may have multiple APN conduits that connect to remote APN nodes. For each APN conduit there exists a separate APN service instance for the APN conduit service type.

The APN conduit service 21 manages network traffic from an APN appliance 95 through router 206, through the WAN, through another router 206 to APN appliance 96. The APN conduit service 21 operates on both nodes 95 and 96, and is used to send and receive data from and to a geographic location that has an APN appliance 95 from/to a different geographic location that has an APN appliance 96 utilizing the full benefits provided by the APN conduit Service for WAN resource allocation and network adaptation. The APN intranet service 23 is used to manage the sending and receiving of data from and to a geographic location that has an APN appliance 95 from and to a different geographic location within an enterprise non-APN site 7 that does not have an APN appliance by way of a WAN link that is also utilized by other APN services.

In another embodiment, an APN intranet service may be used to send and receive data from and to a different geographic location that has an APN appliance, but the administrator selectively configures the APN not to use the APN conduit service 21 for a particular type or class of traffic. The APN internet service 25 is used to send and receive data from and to a geographic location that has the APN appliance 95 from and to a different geographic location that is external to an enterprise network by way of a WAN link that is also utilized by other APN services. An example of traffic using the APN internet service is the traffic associated with a network user accessing a public Internet web server 5. An APN pass through service 27 is used to send and receive data from and to a geographic location that has an APN appliance 95, from and to local site 3 within the same geographic location. In another embodiment, an APN pass through service is used to send and receive data from/to a geographic location that has an APN appliance 95 from and to different geographic location within an enterprise network that does not have an APN appliance and does not traverse the WAN using any WAN links associated with any other APN services.

Figure 1F:
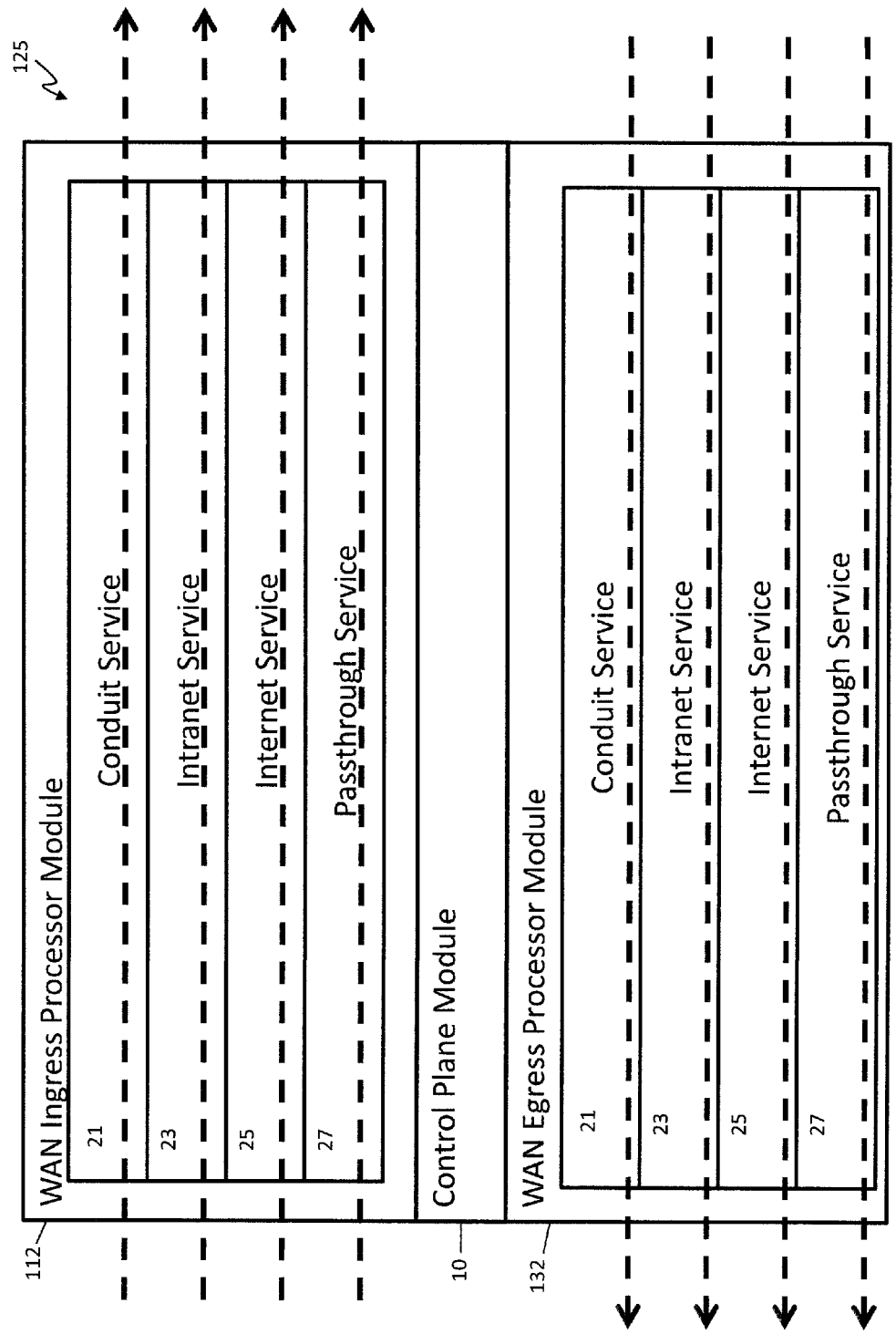
FIG. 1F illustrates adaptive private network WAN ingress and egress processor module service processes according to the present invention.

As illustrated in FIG. 1F, each APN node's WAN ingress processing module 112 includes conduit service 21, intranet service 23, Internet service 25, and pass through service 27, and WAN egress processing module 132 includes a duplicate conduit service 21, a duplicate intranet service 23, a duplicate Internet service 25, and a duplicate passthrough service 27. Each APN service type 21, 23, 25, and 27 implements processes for each type of data traffic that is communicated to and from the WAN respectively.

The APN passthrough service 27 serves as a logical link between the APN appliance's LAN-facing Ethernet and the APN appliance's WAN-facing Ethernet interface. Network traffic processed by the APN passthrough service 27 is passed to or from an APN appliance's LAN-facing Ethernet interface to/from an APN appliance's WAN-facing Ethernet interface as the case may be. The APN passthrough service 27 does not intentionally delay, shape, or modify network traffic as it is transmitted through an APN appliance.

The APN Intranet service 25 provides services to control contention between the Intranet traffic and other APN service traffic for WAN link resources when using common WAN links. The services provided to the Intranet traffic include bandwidth rate limiting of WAN ingress traffic and bandwidth rate limiting and grooming of WAN egress traffic to provide for orderly allocation of WAN resources between contending APN services. Further aspects of rate limiting and grooming are addressed below.

Figure 1G:
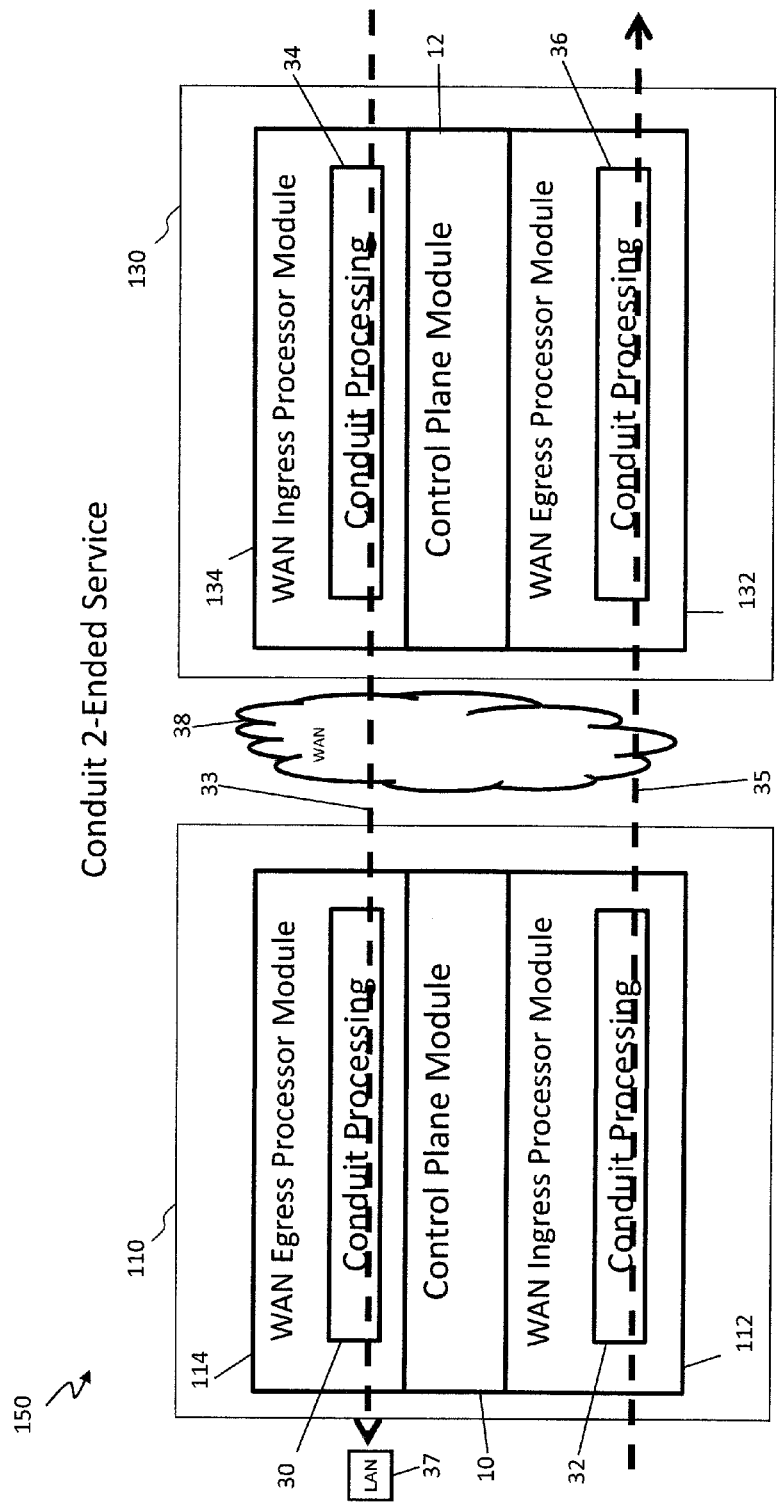
FIG. 1G illustrates an adaptive private network conduit 2-ended service according to the present invention.
Figure 1H:
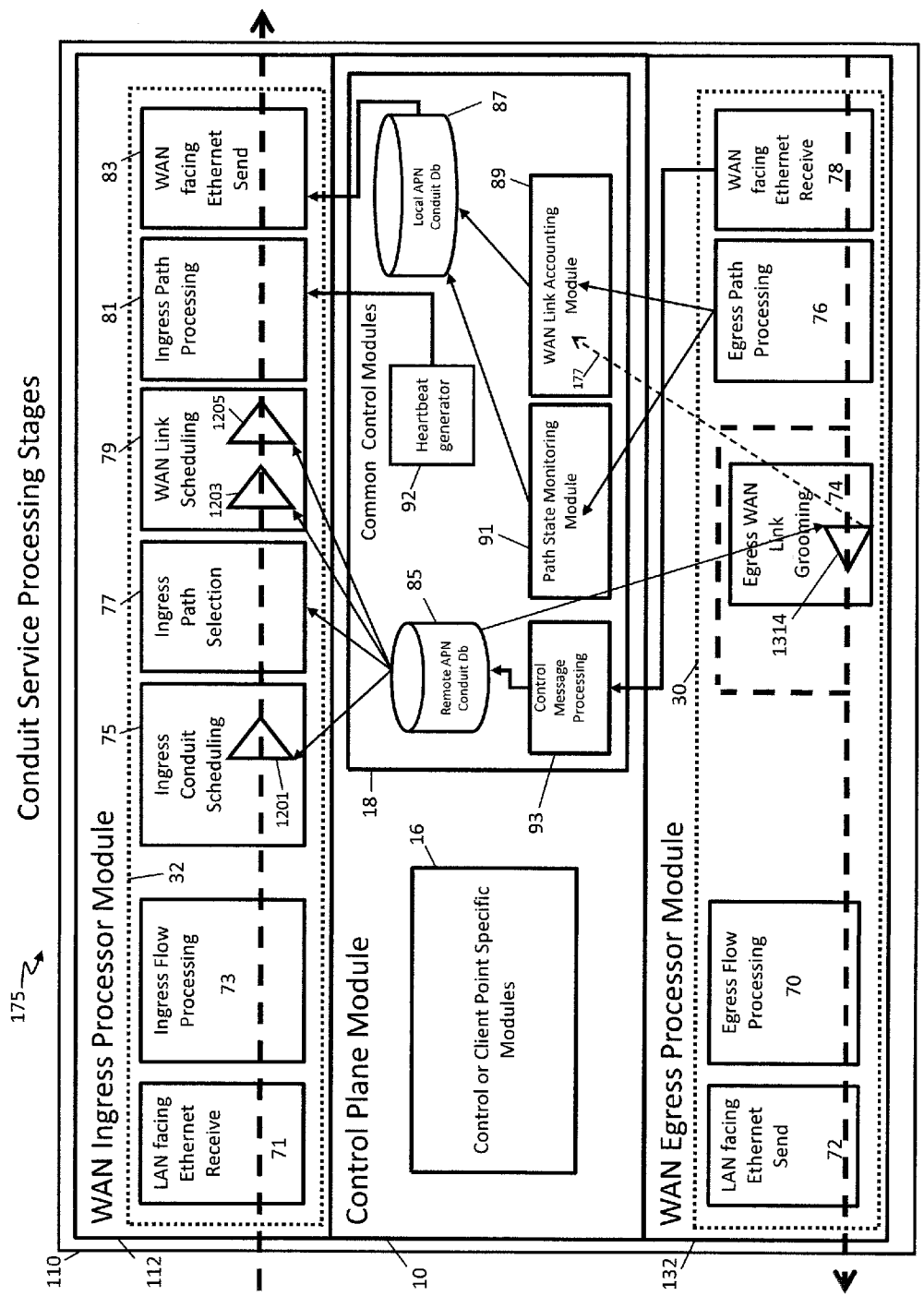
FIG. 1H illustrates adaptive private network conduit service processing stages according to the present invention.
Figure 11:
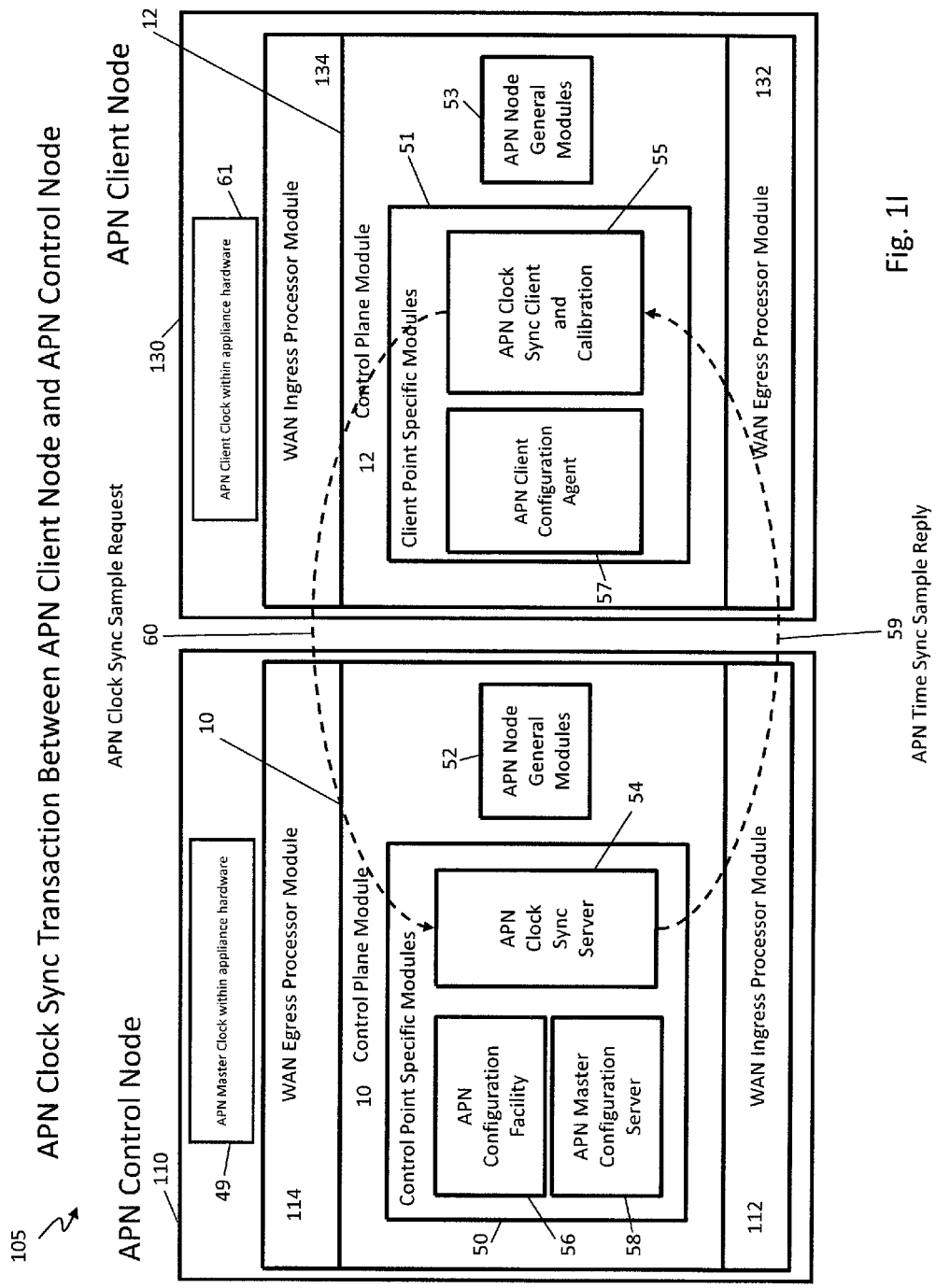
Figure 1J:
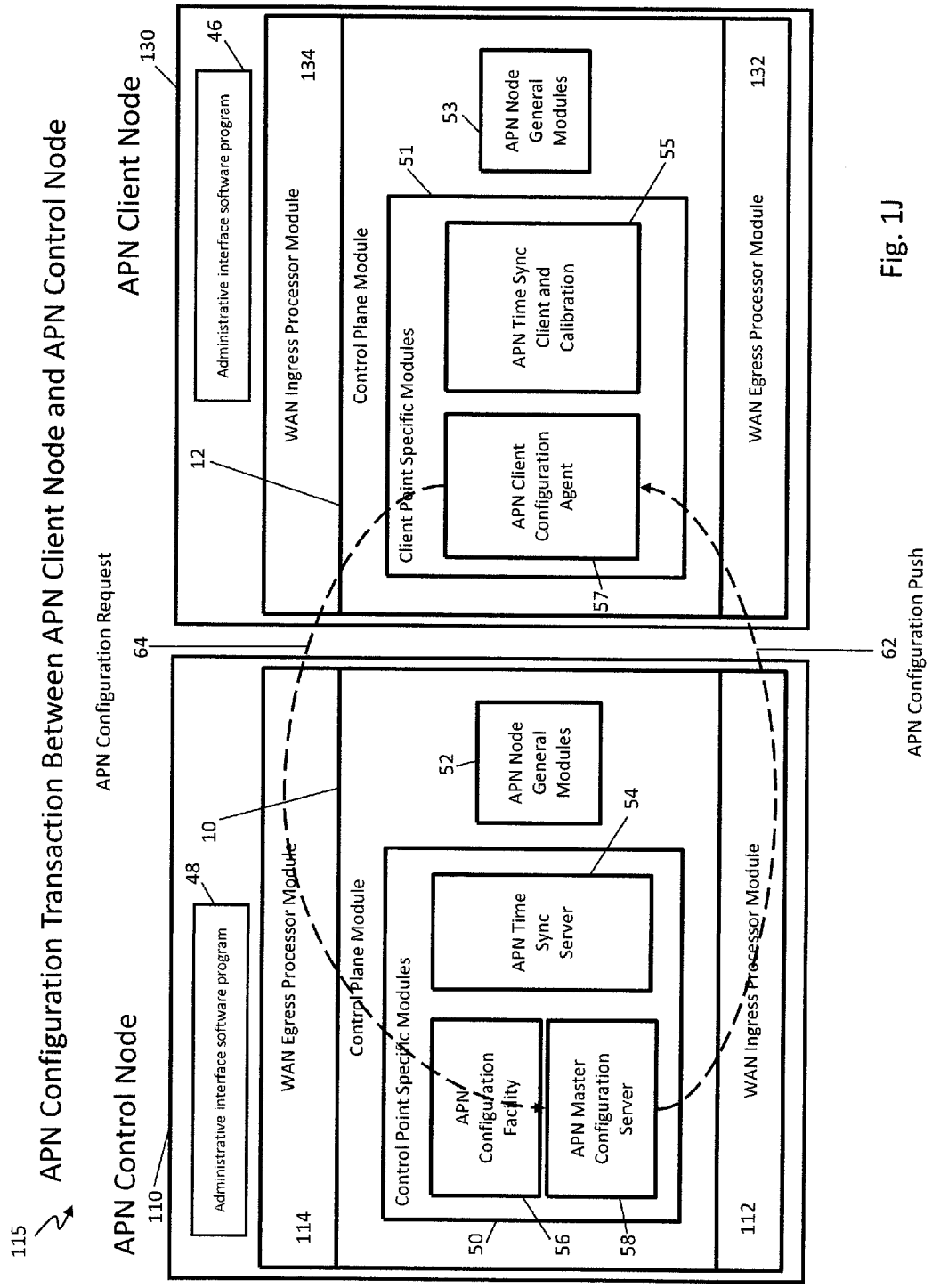
FIG. 1J illustrates an adaptive private network configuration transaction between an adaptive private network (APN) client node and an adaptive private network control node according to the present invention.

The APN conduit service 21 provides the core services of an APN for network traffic as it travels through an APN node. An APN node's WAN ingress and WAN egress processing modules 112 each implement multiple specific processing steps for traffic from and to the WAN. As illustrated in FIG. 1G, APN conduit traffic, bold dashed arrow path 33 and 35, flows through two APN nodes 110 and 130 as the traffic traverses the APN. WAN ingress processing module 134 of APN node 130 performs the WAN ingress conduit service processing 34 prior to transmitting the traffic 33 via the WAN 38 to the peer APN node 110. WAN egress processor module 114 of APN node 110 performs the WAN egress conduit service processing 30 prior to transmitting the traffic 33 to the node or nodes located on LAN 37. The binding of the one APN node's WAN ingress conduit processing 34 to the peer APN node's WAN egress conduit service processing 30 constitutes an APN conduit in which traffic is actively monitored and managed across multiple WAN resources.

In one presently preferred embodiment, APN conduits may exist between the NCN and up to sixteen APN client nodes as shown in FIG. 2, for example, although there is no systemic limit to the number of potential APN client nodes. Each APN conduit may have the unique configuration parameters tailored by an administrator for the particular needs of each geographic location associated with a particular APN.

FIG. 1H illustrates egress conduit service processing stages 30 and conduit service processing stages 32. The WAN egress conduit service processing stages 30 are WAN-facing Ethernet receive stage 78, egress path processing stage 76, Egress WAN link grooming stage 74, egress flow processing stage 70, and LAN-facing Ethernet send stage 72.

The WAN ingress conduit service processing stages 32 are LAN-facing Ethernet receive stage 71, ingress flow processing stage 73, ingress conduit scheduling stage 75, ingress path selection stage 77, WAN link scheduling stage 79, ingress path processing stage 81, and WAN-facing Ethernet send stage 83.

LAN-facing Ethernet receive stage 71 and WAN-facing Ethernet receive stage 78 are responsible for receiving data packet from their respective Ethernet interfaces of the APN appliance. These stages allocate memory buffers from an APN node's memory buffer pool and store the data packets to the memory buffers. WAN-facing Ethernet receive stage 78 also performs decryption services to APN conduit traffic.

LAN-facing Ethernet send stage 72 and WAN-facing Ethernet send stage 83 are responsible for transmitting data packets to their respective APN appliance Ethernet interfaces. These stages free the allocated memory buffers after the packets have been transmitted. WAN-facing Ethernet send stage 83 also performs encryption services to APN conduit traffic.

The egress flow processing stage 70 and ingress flow processing stage 73 and are responsible for the APN flow processing. For purposes of discussion in this document, a network session is defined as the set of traffic that is managed as a unit for processing by an APN. This is a direct mapping to RFC2663, section 2.3 definition of a session for network address translation, which states, "TCP/UDP sessions are uniquely identified by the tuple of (source IP address, source TCP/UDP port, target IP address, target TCP/UDP port). ICMP query sessions are identified by the tuple of (source IP address, ICMP query ID, target IP address). All other sessions are characterized by the tuple of (source IP address, target IP address, IP protocol)."

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes, and service rule that the APN traffic flow matches. The state of APN flow record includes, but is not limited to, APN service type, APN service instance, information pertaining to the last APN path selected, current APN flow sequence number, time of last packet received, time of last packet transmitted, counts of number of packets and number of bytes processed, sets of pending packets for sequence reordering, sets of pending packets for fragmentation, and sets of historical records for packets previously processed.

Figure 3A:
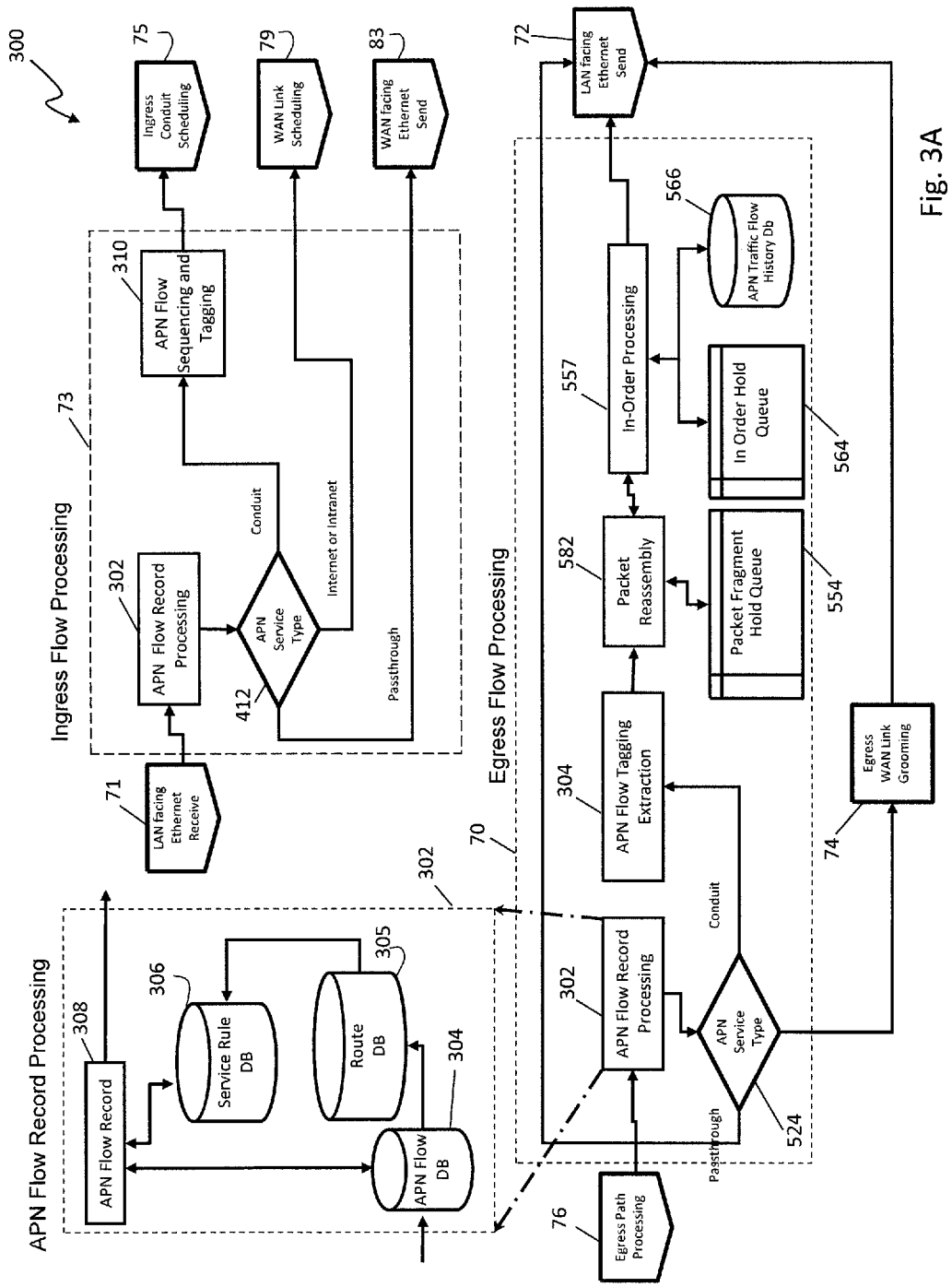
FIG. 3A illustrates the adaptive private network flow processing process according to the present invention.

An APN flow database 304 shown in FIG. 3A includes datasets of APN flow records, keyed, for example, with a 5-tuple, including a source IP, a destination IP, a source port, a destination port, and an IP protocol type.

A route record is held in the memory of an APN appliance. A route record contains an IP subnet and information relating the APN service and APN service instance that APN traffic flows to and from the IP subnet. A route database 305 illustrated in FIG. 3A includes datasets that contains a list of route records. The route database 305 is longest-prefix-match searched using a packet's source or destination IP address to derive a route record. The route database 305 contains a default route record that will be found for any search, if no other better longest prefix matching route record exists in the database.

A service rule record is held in the memory of an APN appliance. A service rule record contains administrator configurable properties used to initialize an APN flow record. A service rules database 306 shown in FIG. 3A includes datasets that contain a list service rule records. The service rules database 306 is searched using a unique identifier key, such as a packet's 5 tuple, APN service type, and APN service instance to derive a service rule record. The service rule database 306 contains a default service rule record that will be found for any search if no other better matching service rule record exists in the database. The service rule record contains administrator configurable properties used to initialize an APN flow record when it is created.

As illustrated in FIG. 3A, the flow record process 302 provides an APN flow record for a packet of an APN traffic flow. The same record process is used for ingress flow processing stage 73 and egress flow processing stage 70. When a packet is received by the flow record processing stage 302, an IP datagram, which is the fundamental unit of information passed across any network utilizing Internet protocol, is parsed to derive an APN flow database search key, which contains a 5-tuple comprising a source IP address, a destination IP address, a source port number, a destination port number, and a protocol ID as well as an IP type of service (TOS) field of the IP header. If the flow record process 302 is invoked by WAN egress flow processing stage 70, and the packet contains an APN fragmentation tag, the APN flow database search key is derived from the APN fragmentations tag. A search of the APN flow database 304 is performed. If an APN flow record exists for the APN flow database search key, then the flow record process 302 is complete, and the found APN flow record 308 may now be used by later stages of processing. In FIG. 1H, flow processing is implemented utilizing stages 73 and 70. If the APN flow record does not exist for this APN traffic flow, then a route database search key is created from either the destination IP address of the packet for WAN ingress flow processing stage 73, or the source IP address of the WAN egress flow processing stage 70. A search of the route database 305 is performed and a route record is obtained. The APN service type and identifiers, such as whether the service is conduit, Internet, intranet or passthrough and if conduit service, which conduit, are retrieved from the route record and combined with the packet's tuple and a service rule database search key is created. A search of the service rule database 306 is performed and a service rule record is obtained. The service rule record contains administrator configurable properties that are used to initialize an APN flow record. The APN flow record is inserted into the APN flow database 304 for future reference. The flow record process 302 is complete, and the APN flow record may now be used by later stages of processing.

As illustrated in FIG. 3A, the packet received by the LAN facing Ethernet receive stage 71 is passed to the ingress flow processing stage 73. The ingress flow processing stage 73 executes the flow record processing 302 for retrieving or generating an APN flow record. At decision step 412 of FIG. 3A, the APN service type is obtained from the APN flow record and used to determine the next stage of processing. If the APN service type is intranet service or Internet service, the packet is sent to WAN link scheduling stage 79. If the APN service type is passthrough service, the packet is sent to the WAN facing Ethernet send stage 83 for processing. If the APN service type is conduit service, the packet will be processed for APN flow sequencing and tagging stage 310 of FIG. 3A. APN ingress flow sequencing and tagging 310 may suitably take place within ingress flow processing stage 73 in FIG. 1H.

The APN flow sequencing and tagging stage 310 assigns an APN flow sequence number which is a serialized sequence number to the packet derived from the sequence number of the last previous packet received on this APN traffic flow, if any. The APN flow sequence number is incremented, accounting for counter wrap and associated with the packet. Once assigned, the APN flow sequence number is written back into the APN flow record for use with the next packet associated with this APN traffic flow. The APN service instance, which is a conduit service instance, is obtained from the APN flow record. From the APN conduit instance, the maximum transmission unit (MTU) size permitted for transmission across WAN is obtained. If the packet size is in excess of the MTU size, a flag indicating that fragmentation is needed is set in the APN flow tag. The eventual fragmentation may suitable be done by the ingress path processing stage 81 of FIG. 3B. If the packet is a TCP Syn or TCP SynACK frame, a standard method is invoked to adjust the TCP sessions' maximum segment size (MSS) indicator. The adjustments of the MSS will prevent packets to follow in the APN traffic flow from exceeding the conduit service instance's MTU size. The packet is tagged with the APN flow tag that includes the APN flow sequence number, and time stamps, and possible fragmentation indication. Once the APN flow sequencing and tagging stage 310 is completed, the packet is forward on to the ingress conduit scheduling stage 75 of FIG. 1H.

As further illustrated in FIG. 3A, a packet processed by the egress path processing stage 76 is passed to the egress flow processing stage 70. The egress processing flow stage 70 executes the flow record processing 302 for retrieving or generating an APN flow record. At decision step 524 of FIG. 3A, the APN service type is obtained from the APN flow record and used to determine the next stage of processing. If the APN service type is intranet service or Internet service, the packet is sent to the egress WAN link grooming stage 74. If the APN service type is passthrough service, the packet is sent to the LAN Facing Ethernet send stage 73 for processing. If the APN service type is conduit service, the packet is processed for APN flow tag extraction from APN flow database 304. Once extracted from the packet header, the APN flow tag contains an APN flow sequence number, and time stamps, and possible fragmentation indication.

Figure 4:
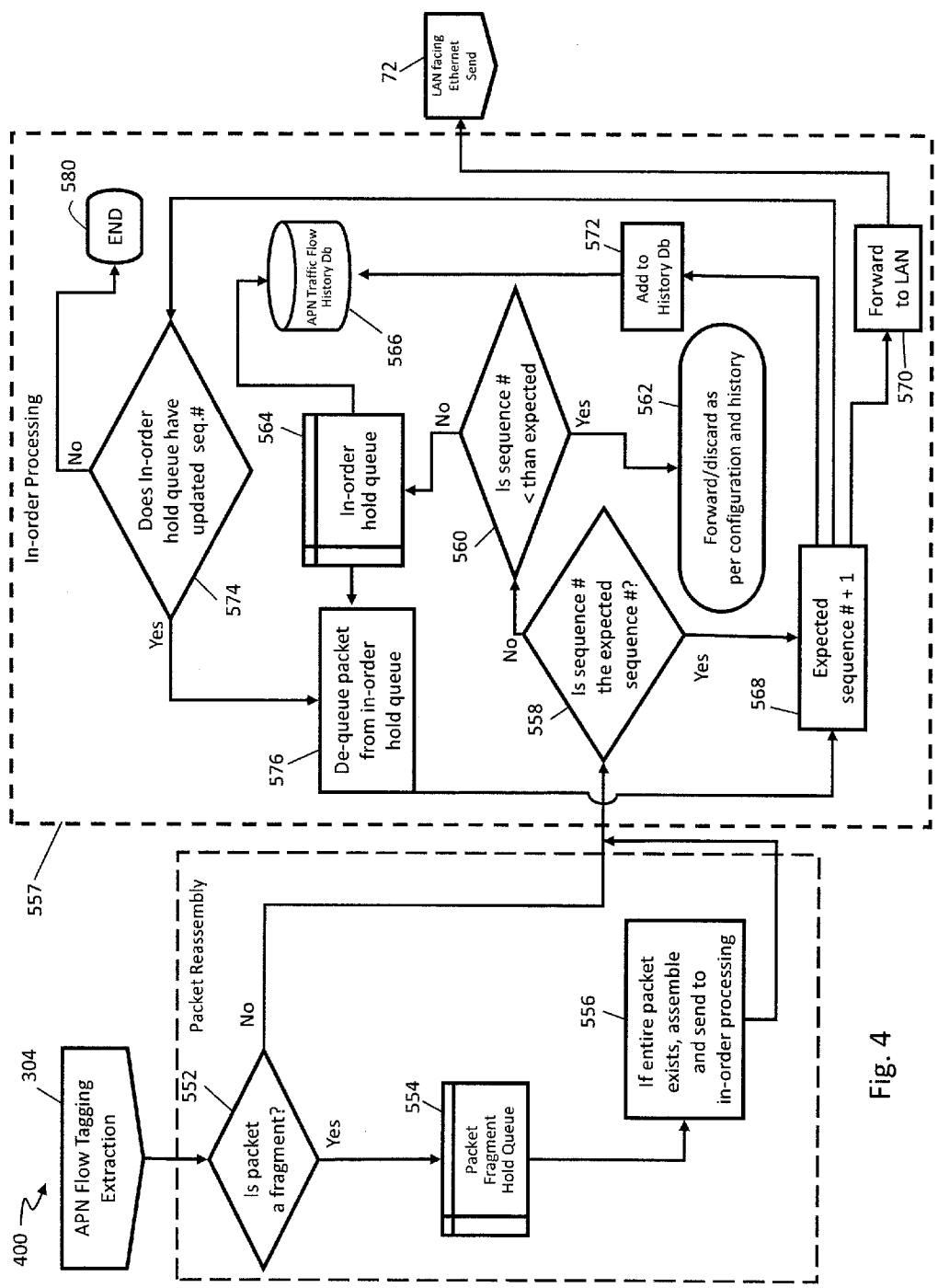
FIG. 4 is a flow diagram illustrating fragment and in-order processing method in operation at the WAN egress processor module according to the present invention.

If fragmentation indication exists, and the indication further dictates that the fragment is the second or a subsequent fragment, an APN fragmentation tag is also extracted. The APN fragmenting tag contains 5-tuple plus TOS APN flow database search key, and a fragmentation sequence number. If the fragment is the first of the fragmentation series, the APN flow database search key is obtained from the normal packet header, and the fragmentation sequence number is assumed to be zero. FIG. 4 expands upon the fragment and in-order processing method shown in operation at the egress flow processing stage 70 of FIG. 3A.

The fragment and in-order processing method of FIG. 4 begins with receiving an APN flow tag conduit service packet from the APN flow database 304. At decision step 552 of FIG. 4, the fragmentation indication of the APN flow tag is evaluated to a determination whether the received packet is a fragment.

If the received packet is a fragment, the fragment is stored in a fragment hold queue at step 554. The fragment hold queue is referenced by a field in the APN flow record in fragmentation sequence order. At step 556, once an entire packet has been received, the packet is assembled from fragments stored in the fragment hold queue and sent to in-order process 557.

Returning to decision step 552, if the received packet is not a fragment, the packet is sent to the in-order processing method 557. The in-order processing method 557 begins at decision step 558, where a determination is made whether the APN flow sequence number from the APN flow tag is the expected sequence number by comparing the sequence number to the current sequence number stored in the APN flow record.

If the APN flow tag sequence number is not the expected sequence number, the in-order processing method 557 proceeds to decision step 560. At decision step 560, a determination is made whether the sequence number is less than the expected sequence number. This comparison is done with accommodation made for the sequence number wrapping.

If the sequence number is less than the expected sequence number, an APN traffic flow history database is searched to determine if an entry exists for this sequence number. If the entry for this sequence number does not exist in the APN traffic flow history database, then the in-order processing method 557 proceeds to step 562. At step 562, the received packet is either forwarded or discarded according to the APN flow record requirements. If the entry for this sequence number does exist as a sequence record and there is an indication of a prior successful transmission, the packet is discarded. This is a normal occurrence if properties of the APN flow traffic have indicated packet duplication, or if a speculative path retransmission took place because of abnormal acute delay. If the sequence record does exist and there is an indication of a prior unsuccessful transmission, the packet is either forwarded or discarded at step 562 according to the APN flow record requirements.

Returning to decision step 560, if the sequence number was determined to be greater than expected, the in-order processing method 557 proceeds to step 564. At step 564, the received packet is stored in the in-order hold queue.

Returning to decision step 558, if the sequence number is the expected sequence number, the in-order processing method 557 proceeds to step 568. At step 568, an expected sequence number is incremented by one in preparation for the next packet to be received. At step 570, the packet is sent to the LAN facing Ethernet sent stage 72. At step 572, a record of the packet's APN flow sequence number associated prior successful transmission is stored in the APN traffic flow history database 566.

At decision step 574, a determination is made whether an in-order hold queue contains a packet that was dependent on the updated sequence number. If a packet that was dependent on the updated sequence number is found, processing method proceeds to step 576. At step 576, the previously received packet that has a sequence number that is one greater than the packet last received is dequeued from the in-order hold queue and the in-order processing method 557 returns to step 568.

Returning to decision step 574, if an updated sequence number is not found, the in-order processing method 557 proceeds to step 580. At step 580, the in-order processing method 557 is stopped.

A time driven process, not shown, interrogates the in-order hold queue 564 periodically. If during this interrogation, a packet has been in the hold queue in excess of a pre-specified maximum time, the packet is released to the LAN Facing Ethernet send stage 72 for processing and a record of the packet's APN flow sequence number and its successful transmission is stored in the APN traffic flow history database 566. A record of any dependent APN flow sequence numbers that were being waited for by the released packet but did not arrive and their unsuccessful transmission are stored in the APN traffic flow history database.

In addition to the above, the in-order processing method 557 has the ability to relearn the APN flow sequence number if a number of factors occur, such as a sustained predefined period of time and count of packets without matching the APN flow record's APN flow sequence numbers and the pending packet in the in-order hold queue are found to be in a sequential set. Relearning of APN traffic flow sequence numbers is not an atypical occurrence. For example, if one APN appliance was to be reset, the ingress flow processing stage 73 of FIG. 1H would create new APN flow records for preexisting sessions that may be still exist in the egress processing side of the APN. The new APN flow records would typically have sequence numbers different from the prior sequence numbers. This relearning permits APN traffic flows to continue with little to no impact to the end users even if the APN nodes themselves are reset.

As illustrated in FIG. 1H, the ingress conduit schedule stage 75 processes packets after the ingress flow processing stage 73. The ingress conduit scheduler 1201 combines one or more different APN traffic flows into a set of queuing points for packets destined to be transmitted across the APN. The rate that the ingress conduit scheduler 1201 forwards traffic to the ingress path selection stage 77 for a particular conduit instance has its upper limit rate determined statically by the administrator's configuration of the APN and the WAN links within the APN at the APN control point. The rate of the ingress conduit scheduler 1201 for a conduit instance may be changed dynamically to a rate below the configured upper limit by the remote APN node's WAN link accounting module 89 and path state monitoring module 91. As APN traffic is processed by the egress path processing stage 76, tracking information on congestion and recent use is monitored by these modules 89 and 91. The modules perform on demand bandwidth allocation between APN services and APN service instances and indicate these bandwidth allocations by storing permitted bandwidth into the local APN conduit state. This state is propagated via APN quality reports to the local control message processing stage 93, which stores the allocation to the remote APN conduit state 85 and changes the conduit scheduler rate. In addition, the ingress conduit scheduler 1201 may be changed dynamically to a rate below that indicated in the APN quality reports if local WAN link scheduling stage 79 for other APN services or conduits show contention outside of the administrator configured fair share, or the conduit is not actually using an allocated rate that could be otherwise of use to other APN services or conduits. For example, the reallocation may be from one conduit that has low utilization to another conduit that has high demand for shared WAN link resources. Further, the reallocation may be to non-conduit APN services, such as to an Internet service.

The APN traffic flow is directed to a particular ingress conduit scheduler queuing point by the administrator configured properties defined for the APN service rule record that was used to initialize the APN traffic flow record associated with the APN traffic flow. In a present embodiment, a conduit supports up to ten queuing points, but there is no practical or technical limit. A conduit's queuing point is called a conduit class. The set of classes are divided into three administrator configurable categories, real time, interactive, and bulk, which is typical for network devices. It is possible for an administrator to further tune within these three categories of class types to provide enhanced service levels for different APN traffic flows. For example, file transfer APN traffic flows may be directed to a bulk class with substantial queuing memory space and potential delay so as to achieve the highest possible bandwidth availability, whereas a Voice-Over-IP APN traffic flow may be directed to a higher priority real time class with much less queuing memory space so as to prevent potential for jitter or delay. Once a packet is scheduled by the ingress conduit scheduler, it is advanced to ingress path selection stage 77.

An APN traffic flow can be engineered to be transmitted one of three ways across an APN via a conduit. The APN traffic flow may be duplicated across multiple paths between two APN nodes, the APN traffic flow may have its packets load balanced across multiple APN paths, or the APN traffic flow may have its packets bond to a single persistent path. The administrator configures an APN traffic flow to use one of these three modes by specifying the related requirements in an APN conduit service rule for the APN traffic flow. When the APN flow record is created for the APN traffic flow, these requirements are reflected in the APN flow record.

Figure 3B:
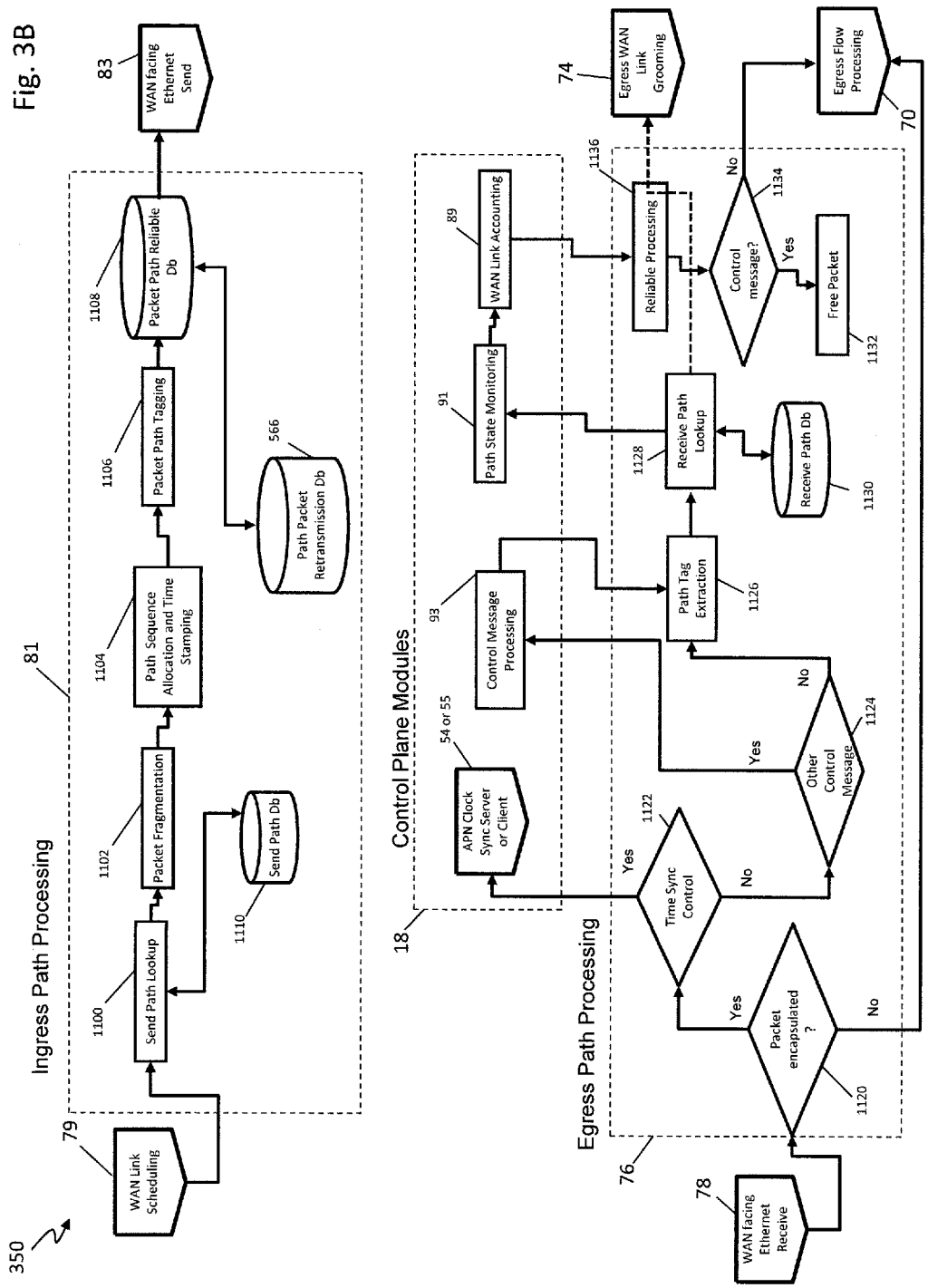
FIG. 3B illustrates the adaptive private network path processing process according to the present invention.
Figure 3C:
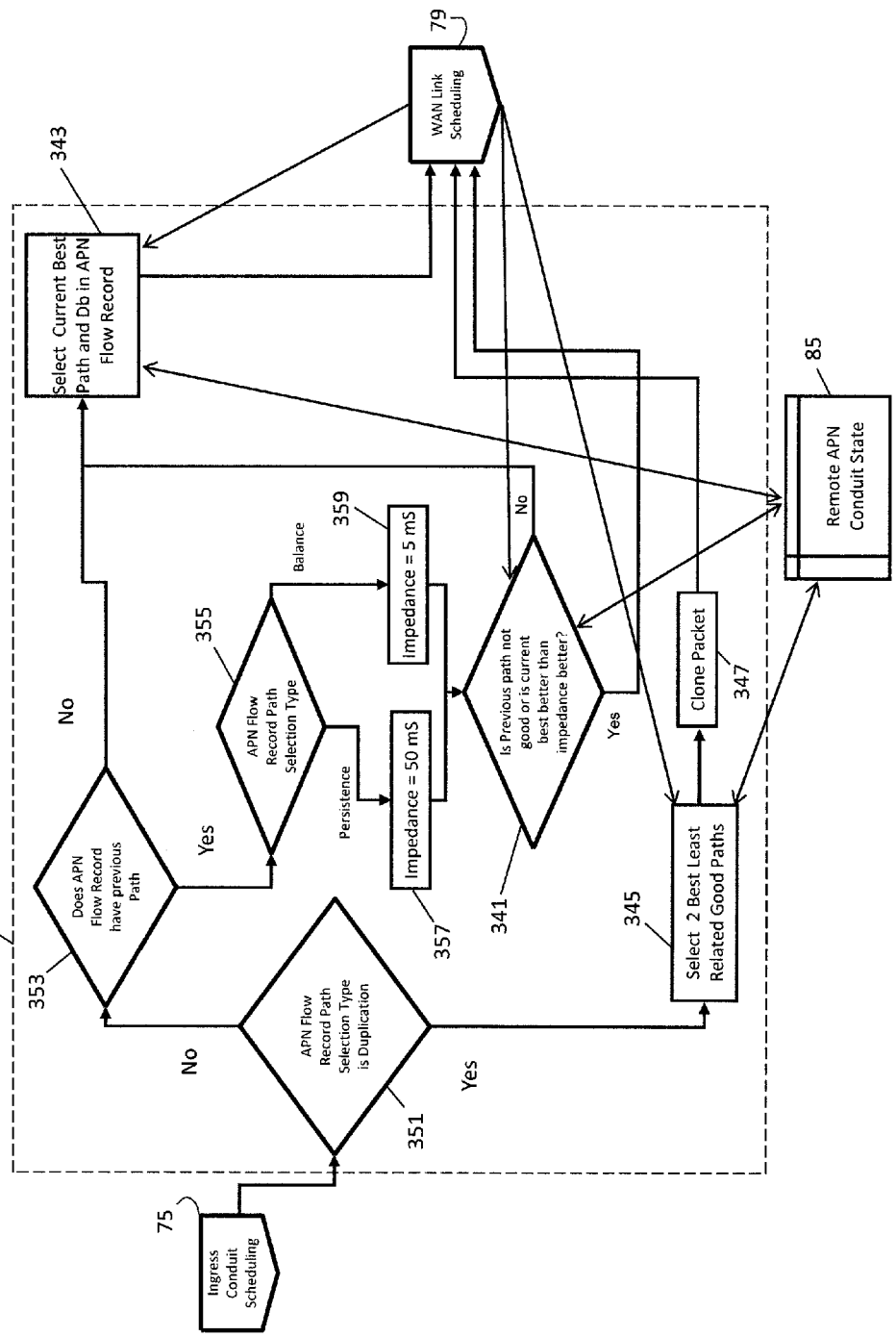
FIG. 3C illustrates an APN ingress path selection process according to the present invention.

As illustrated in FIG. 3C, the ingress path selection stage 77 uses information from the APN flow record, the remote APN conduit state 85, and the current priority sensitive packet queue depths pending within the WAN link Scheduling 79 for the selection of APN paths that a packet or packets will use for transmission across the WAN to the remote APN node. The ingress conduit scheduling 75 drains packets from the conduit classes and presents them to the ingress path selection process operating in the ingress path selection stage 77.

Figure 7:
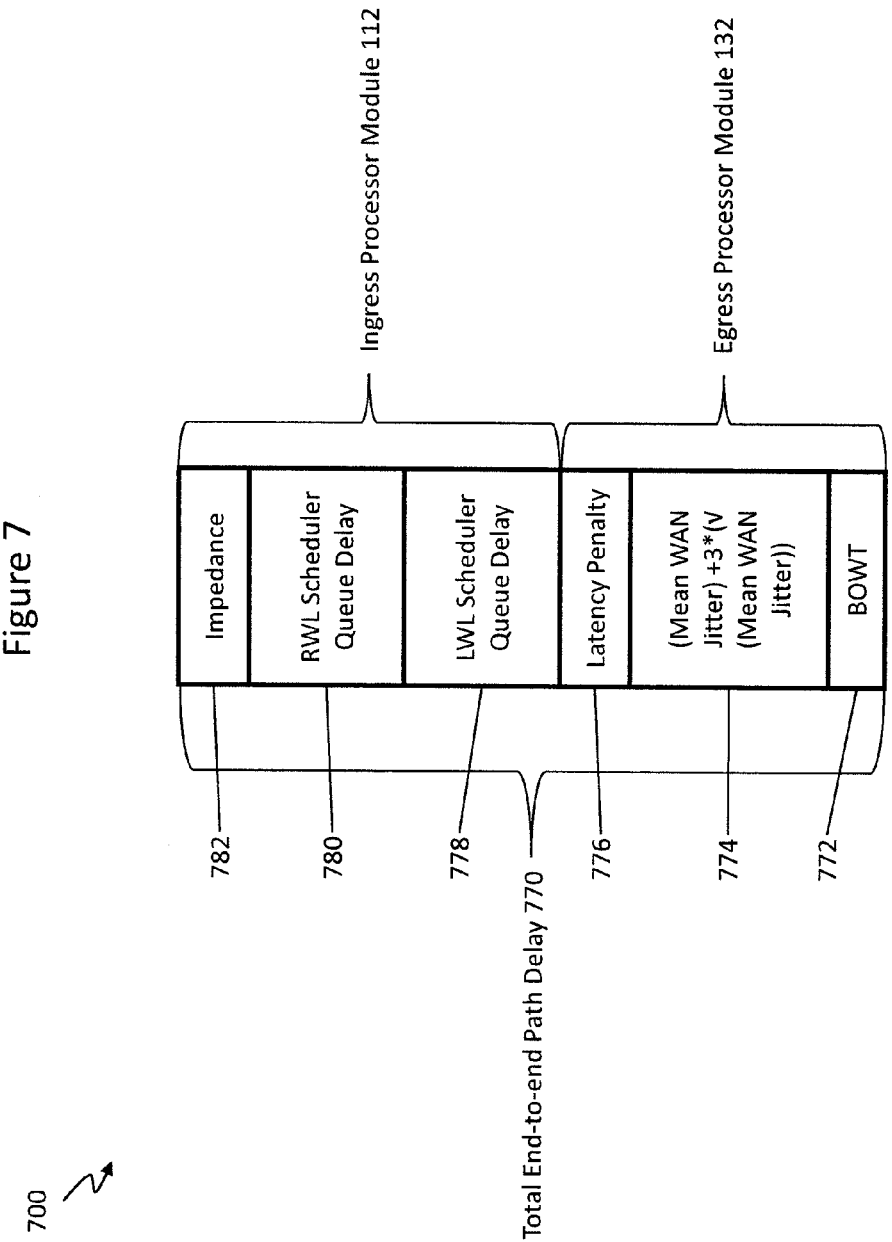
FIG. 7 is a diagrammatic representation of factors used to determine the total end-to-end path delay according to the present invention.

In all path selection types, the use of a best available path process operating in step 343 is used. For a definition of APN path states, a description of path processing services is provided below. Any paths currently in a path quality good state are eligible to be chosen first. If multiple paths are in a path quality good state, then an estimated end to end time is evaluated and compared for each path. If no path is in path quality good state, then a path with the highest bandwidth path quality bad state is chosen. FIG. 7 illustrates factors which may suitably be used to determine an estimated end-to-end time in an evaluation process of a best path as compared to other alternative paths. The term "One Way Time" (OWT) refers to the amount of time it takes for a packet to traverse a network from source to receiver. In the context of this invention, the one way time is measured by subtracting the receive time stamp from a WAN Egress Module 132 from the send time stamp from a WAN Ingress Module 112, FIG. 1G. The term "Best One Way Time" (BOWT) refers to the lowest measured OWT for a particular packet on a particular path over a period of time. Initially, the evaluation process chooses one best path based on path latency which is calculated using a best one way time (BOWT) 772, mean WAN jitter 774, latency penalty for short term instability 776 and WAN link scheduler's queue delay times 780 and 778, with additional preferential treatment referred to as impedance 782 applied to any prior primary path for the APN traffic flow, if a primary path exists. Thus, an exemplary formula for estimating total end-to-end path delay is the BOWT 772+(mean WAN jitter 774)+3*($\sqrt{}$ (mean WAN jitter 774))+latency penalty 776+local WAN link scheduler queue delay 778+remote WAN link scheduler queue delay 780+impedance 782. The BOWT 772, mean WAN jitter 774 and latency penalty 776 are provided by the remote APN conduit state 85 resulting from control messaging from the egress processor module 132 of FIG. 1H, while the local WAN link scheduler queue delay 778, remote WAN link scheduler queue delay 780 and impedance 782 are provided by the WAN ingress processor module 112 of FIG. 1H.

Impedance is employed as the present invention recognizes that a typical queuing system follows a Poisson distribution. In other words, a typical queueing system has a statistical probability curve that, when plotted on a chart, is highly slanted to the left, with potentially long tail to the right. Although the probability equation to determine the ~99% path delay time is very sound, it is also important of note that any probability is not a certainty. Although sending a packet on a particular stable path will typically with ~99% certainty result in the packet arriving at or before a statistical jitter calculation, when the packet arrives before the ~99% time is much less certain. For example, if there are two paths that both have ~99% certainty of arrival at 50 ms, it is very possible that one path will be more skewed in its probability to the left with a potentially higher one way time than the other path. If every other packet was transmitted to each of the otherwise ~99% probability equivalent paths to a remote APN node, it is highly likely that the packets would frequently arrive out of order at the remote APN node. Thus, the packet transmission would result in longer hold times and a potential loss of transmit opportunity for higher priority traffic from the sending APN node. It can be appreciated that if sets of sequenced packets are sent on the same paths, these sets have a higher likelihood of packets arriving in order at the remote APN node, resulting in much fewer instances of holding of packets for reordering. By allowing for up to 5 msec of additional queuing time per path prior to switching paths, a much more efficient end-to-end system is achieved. There still is a potential for some resequencing when the 5 msec switch over occurs, but it is understood that this would be for APN traffic flows which are exceeding a path's allocated bandwidth and have greater tolerance for the resulting delay. Various types of data traffic, such as high definition video streaming may be handled in an alternative method as an exception to the use of impedance as described above.

In decision step 351 of FIG. 3C, a determination is made whether the path selection type is duplication based on information extracted from the APN flow record. If the selection type is duplication, then the ingress path selection stage 77 advances to selection step 345. In selection step 345, path latency, jitter and quality state are extracted from the remote APN conduit state 85, and the queue delay time for all respected paths are extracted from the WAN link schedulers 79. Using the extracted information, path selection takes place in selection step 345 returning two viable paths that are as unique from each other as possible in terms of sharing as little of the same WAN link resources as possible. This selection approach includes attempting to avoid using the same WAN link for paths either on WAN ingress or on WAN egress. This selection approach also includes evaluating administrator specified ISP identifications for each WAN link that enable the path selection process to avoid using two otherwise unique WAN links, which are then known to be from the same service provider. The path selection process iteratively evaluates all possible path combinations available starting with the most independent, and if not available, compromising to lesser dependent path combinations in stages. Initially, the path selection process chooses the one best path using the best available path selection criteria of step 343 with an administratively configurable impedance of 5 msec or 50 msec to the prior primary path for the APN traffic flow, if one exists.

After the primary path is determined, the algorithm attempts to find a secondary path on which the duplicate packet is to be transmitted. The APN flow record contains within it a tolerance for egress flow processing hold time. In addition to impedance, the best available path process takes into account the time differential between the potential latency, jitter and queue time of the primary path and any potential secondary path. If the differential exceeds the egress hold time, the path is not eligible to be selected as the secondary path, since this would typically result in the packet being delayed beyond the hold time tolerance. Thus, a packet is discarded if the packet on the primary path was lost thereby serving no purpose or value to the APN traffic flow.

Initially, the best available path process searches for an ideal set of paths having unique ISP identifications on the remote and local WAN Links. If this is not found, the best available path algorithm searches for a set of paths having unique ISP identifications on the remote WAN links and otherwise unique local WAN links. Third, the best available path process searches for paths with otherwise unique remote and local WAN links. Fourth, the best available path process searches for paths with a single local WAN link and otherwise unique remote WAN links. Should none of these sets of paths be found, the best available path process settles for one path sharing a single pair of WAN links, which means the packets to be duplicated are simply transmitted on a single path twice. Once the best available path or paths are determined, a packet buffer is allocated and the packet is copied. Both packets are forwarded to the WAN link scheduler stage 79 where the packets are scheduled on their respective WAN links.

Referring back to decision step 351, if the APN flow record does not indicate a duplicate packet requirement, the APN flow record is evaluated to determine if a prior path was used for the flow in decision step 353. If no prior path was used for the APN traffic flow, the ingress path selection stage 77 proceeds to the best available path selection process in step 343 without any impedance preference. If a prior path does exist for the APN flow record, then decision step 355 determines if the APN traffic flow is to be load balanced or is a persistent path. If the APN flow record indicates load balancing is desired, the impedance is set to 5 msec at step 359. If path persistence is desired, then the impedance is set to 50 msec at step 357. If the prior path, even with preferential treatment because of impedance is not as performing as well as a present alternative path, a new path is chosen using the best available path selection process in step 343. As noted, persistent paths are in actuality only semi-persistent up to 50 msec. The justification is that the prior persistent path was determined to be the best available path at the time it was chosen, however the network state has changed and a substantially better alternative path has become available. The moving of the APN traffic flow in this circumstance best serves the network users need for lower latency. Because of the APN solution's egress flow in-order processing, typically the move from one high latency path to another lower latency path has no ill effects, and with 50 msec impedance would typically happen rarely.

The path chosen is stored into the APN flow record for use if another packet is processed for this APN traffic flow. The packet is now forwarded to the WAN link scheduling stage 79 of FIG. 1H.

Figure 8:
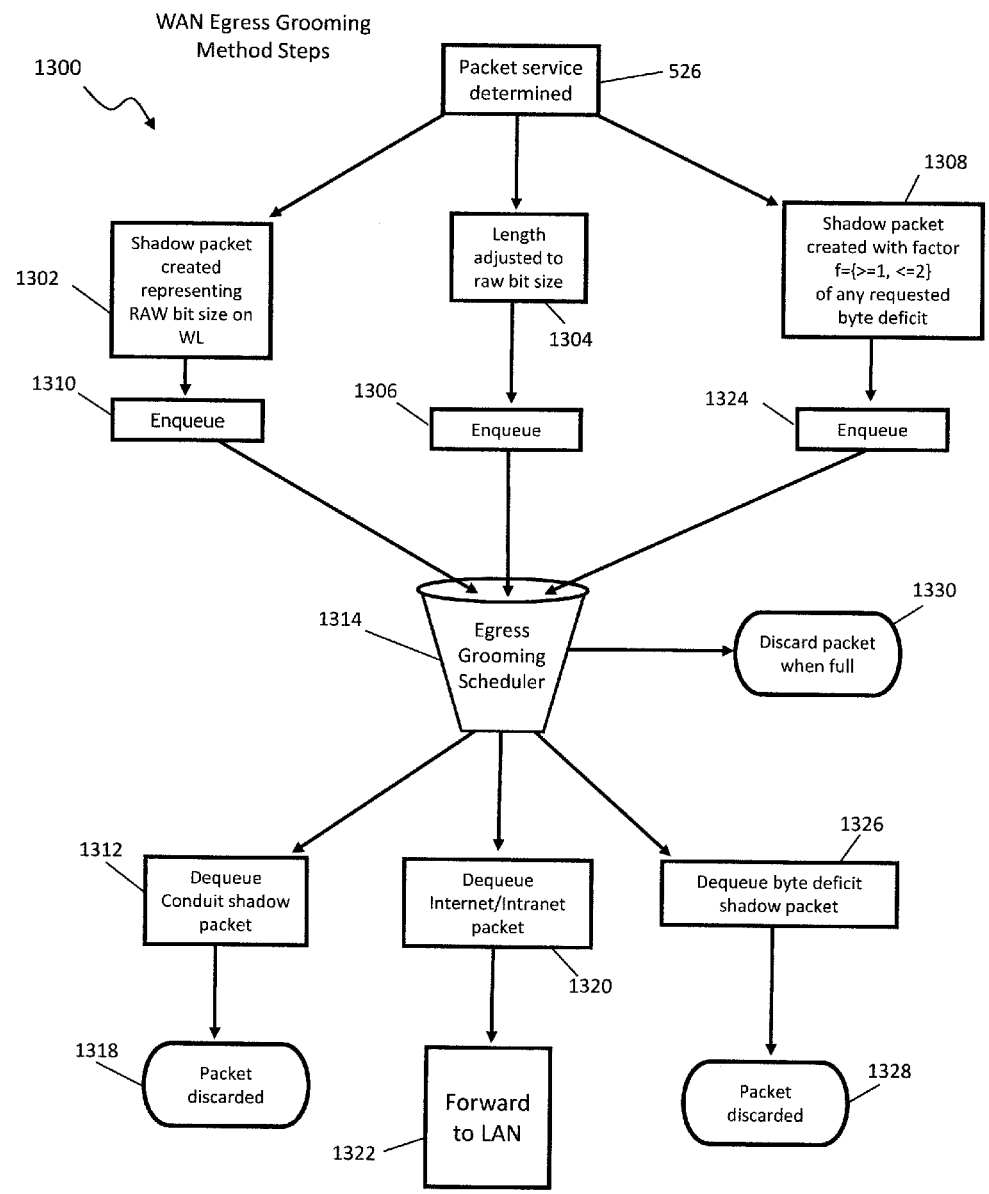
FIG. 8 is a flow diagram illustrating WAN egress processor module grooming steps according to the present invention.

As illustrated in FIG. 8, the WAN link grooming manager 1300 is responsible for managing WAN link utilization between APN conduit traffic and Internet or intranet (I/I) traffic. The grooming manager 1300 tracks APN conduit and Internet or intranet (I/I) traffic levels, measuring them against administrator configured path sharing rules, and signals via signal 177 the WAN ingress processor module 112 which is running a forwarding plane software module in the control plane module 10 of FIG. 1H to allow it to balance the path load.

In an embodiment of the present invention, conduit packets can bypass WAN egress grooming and thereby avoid delay. To prevent congestion, an APN conduit packet shadow is sent to the I/I grooming manager 1300 so that the grooming manager 1300 does not over estimate bandwidth.

The WAN egress grooming manager 1300 executes a process that begins at step 526 where a packet service type is determined to be conduit, Internet, intranet or byte deficit. The egress grooming scheduler 1314 may be embodied as a token bucket scheduler set to drain at the rate permitted by the control plane module 10 of FIG. 1H for the egress WAN link and contains a fair share class for Intranet, internet and each of the conduits in the APN, as well as a strict realtime class for byte deficits.

If the packet service type is determined to be conduit, a shadow packet is created at step 1302 with a length representing the raw bit size of the actual conduit packet on the WAN link (WL) and at step 1310 the shadow packet is enqueued into a class set to drain at the rate currently permitted by the control plane module 10 for its corresponding conduit on an egress grooming scheduler 1314. As the shadow packets drain from the scheduler at the allowed rate, they are dequeued at step 1312 and discarded at step 1318 having served their purpose for consuming bandwidth for the scheduler.

If the packet service type is determined to be Internet or intranet, the packet is adjusted at step 1304 to represent the raw bit size of the packet on the WAN link and at step 1306 the packet is enqueued into a class set to drain at the rate currently permitted by the control plane module 10 for its corresponding Internet or intranet service on the grooming scheduler 1314. As the packets drain from the scheduler at the allowed rate, they are dequeued at step 1320 and forwarded to the LAN at step 1322.

If the packet service type is determined to be byte deficit class, a shadow packet is created at step 1308 with a length representing a factor f={≥1, ≤2} of any byte deficit. At step 1324, the shadow packet is enqueued into a strict real time priority class that will preempt all conduit shadow, Internet and intranet packets currently queued. When the shadow packet drains from the scheduler 1314 at the allowed rate, it is dequeued at step 1326 and discarded at step 1328 having served its purpose for consuming bandwidth on the scheduler.

If the egress grooming scheduler 1314 becomes full, Internet and intranet packets will be tail dropped or discarded at step 1330. Since most Internet and intranet traffic is sent using transport control protocol (TCP), this approach will indirectly cause the original packet sender to reduce the sending rate and prevent Internet and intranet traffic from preempting conduit traffic on the egress WAN link.

APN path processing services are responsible for providing a means of communicating user data and control information from one APN node to another APN node across the network. In particular, from the WAN ingress processor module 112 of one APN node across the WAN and received at the WAN egress processor module 132, as shown for example in FIG. 1J. Exemplary APN path services which may be provided are listed below:

1.) Universal path tagging of all conduit traffic sent across the WAN with high resolution and highly synchronized APN time stamps to enable the highly predictive estimation of transmission latency and statistical variation of latency, subsequently in tandem with the control plane modules' path state monitoring service, such as provided by path state monitoring module 91 of FIG. 1H is used to detect optimal paths for traffic to use across the APN.

2.) Use of the above optimal path identification to provide, in tandem with the WAN link accounting module 89 of FIG. 1H, WAN bandwidth reallocation from low performing paths to higher performing paths.

3.) Universal path tagging (FIG. 3A, step 310, for example) of all conduit traffic sent across the WAN APN path with path sequence number enables sub second detection of packet loss enabling fast retransmission of user packets with little to no negative effect to the end users.

4.) Continual monitoring of and characterization of network behavior at times of lower utilization using heartbeats for fast reaction when network demand does arrive, as provided by heartbeat generator 92 in FIG. 1H.

5.) The ability to identify and proactively solicit retransmission when network traffic has been extraordinarily delayed or if the network has ceased to function using a Nag method, as provided by a Nag process, operating on the path state monitoring module 91 in FIG. 1H.

6.) Universal path tagging of all conduit traffic with network utilization and non-utilization of WAN link resources enabling early detection and avoidance of network congestion prior to the packet loss that is typical of normal TCP like congestion methods, as provided by FIG. 3B, Step 1106.

7.) The ability to transmit time sensitive control messages without typical internal scheduling delays for software process staging to rate schedulers, while still maintaining proper long utilizations to the APN network to do retransmission of lost packets without the highly predictive estimation of transmission latency and statically variation of latency, as provided by step 93 in FIG. 1H.

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way Time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process 91. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path lost thresholds over numerous durations simultaneously and continually while still maintaining low processor overhead. The result is the ability to detect the difference between occasional incidental short term network loss and long term persistent problems.

A dead path state represents a condition of a network path where a WAN egress processor module has not received packets from a WAN ingress processor module for an extended period. A dead path is excluded from path selection for user data.

A bad path state indicates a situation when a WAN egress processor module determines that packet loss for a path has exceeded a defined loss threshold for a good path state over one of the threshold periods monitored. Paths in a bad path state are excluded from path selection if any paths in the conduit are in good path state.

A good path state indicates a situation when a WAN egress processor module determines that a path's short-term packet loss is below a defined loss threshold, and that the path is therefore in neither a bad nor a dead path state.

Referring to FIG. 1H, a heartbeat generator 92, running on the control plane module 10 may send a packet periodically called a "heartbeat packet" to remote APN nodes for each path within a conduit. In one embodiment, if no data packets are being received by the WAN egress processor module 132 running a path state monitoring module 91, the heartbeat generator 92 send at least one heartbeat packet about every 50 msec. If data packets are being sent with an inter-packet interval of less than 50 msec, then the WAN egress path state monitoring module 91 does not expect to receive heartbeat packets.

This monitoring of the paths during unutilized periods permits better detection of the network distortions on an ongoing basis, thereby providing a more accurate and dynamic indication of the path performance qualities over time, increasing the predictive modeling of behavior when the network is utilized.

A software process called the Nag process operates on the path state monitoring module 91, and refines silence detection to allow shorter periods of silence to become significant in certain cases. The term "Nag" is not an acronym. This programmed algorithm is so named due to the metaphorical "nagging" packets it sends when required. The Nag process, when packets are overdue, initiates the sending of a nag packet to the WAN egress path processing stage 76 to initiate a preemptive re-transmit of packets that may have been lost during the sustained period of silence. The path that received a Nag packet is marked "suspect," which will prevent it from being selected to retransmit reliable packets or any non-path specific, processor time sensitive control messages. By sending the Nag packet when a lost packet is suspected, the amount of time spent waiting for missing packets is reduced, at a minor cost of occasionally requesting and performing a retransmission when a packet was merely delayed.

Late packets are determined using a predetermined late period. It has been found that for paths where the last packet's path tag was set with a more-to-come indication, a late period of about the MIN (2*the 99% arrival time, heartbeat interval)+20 milliseconds is reasonable. If a packet in a sequence does not arrive within the predetermined late period after a preceding packet in the same sequence has arrived, the packet is suspected of being lost or delayed and a Nag packet requesting retransmission is sent to the WAN ingress APN node.

By sending the Nag packet when a lost packet is suspected, the amount of time spent waiting for missing packets is reduced. This improvement comes with a minor cost of occasionally requesting and performing a retransmission when a packet was merely delayed.

Once the paths' performances are quantified, bandwidth can be allocated among the paths. In an embodiment, a minimum amount of bandwidth is allocated to all paths, such that the performance of each path can continue to be estimated. Then, the bandwidth is allocated to the fastest path first, such that the fastest path is supplied with as much bandwidth as it could possibly use, herein called its maximum usable bandwidth. The remaining bandwidth is allocated in the same manner to the remaining paths; the fastest remaining path is completely supplied before allocating bandwidth to the next fastest path. Bandwidth may be allocated by other methods to achieve a desired performance. For example, the bandwidth may be allocated such that the lowest average path latency is achieved.

The APN path tag as built by the WAN ingress processor module contains byte counts that represent both amount of data actually transmitted to a destination WAN egress WAN link, as well as an indication of the amount of data that ideally could have been scheduled had the WAN link scheduler been fully utilized with data. The WAN egress processor module extracts the APN path tag at step 1126 of FIG. 3B and passes it and the high resolution time stamp of when the packet arrived to the WAN link accounting process 89 of FIG. 1H. The WAN link accounting process runs a continual summation of the idealized data curve and compares its own local summation of the idealized data curve based upon the passed in arrival time stamps for the WAN link. If, over a sustained period, the idealized curve represented by the incoming stream of packet from the WAN shows a deficit as compared to the local idealized curve on the receiving APN node, the WAN link or some other bottleneck in the network is becoming congested. The congestion is typically remedied by indication of the deficit for the WAN link in the conduit quality reports. This indication may be utilized to request the WAN ingress module to scheduler more shadows, thus decreasing the amount of real data transmitted across the network that may be able to congest the WAN link. Eventually as the congestion starts to become alleviated, the idealized rate summation curve for the sending APN node will start showing rates above the local idealized curve, therefore showing credits that cancel out the accumulated prior deficits. Because packet order changes occur between potentially multiple paths destined for one WAN link with each path having potentially different latencies, a normal level of credit and debit variation within a range is to be expected and does not trigger congestion control.

This method is intended to detect congestion even when the WAN link is not intentionally saturated with data from the WAN ingress side of the network. Typically, congestion would be indiscernible from normal underutilization of the resource. Both look as if the WAN egress is receiving less data than possible, but in the former case, it is because of a bottleneck between the WAN links. In the latter case, it is because there just is nothing or not enough requiring sending. By the method tagging the packets from the WAN ingress side with an indication of how much data could have been sent, it is possible to quantify how much the former or the latter case is affecting the system.

Figure 5:
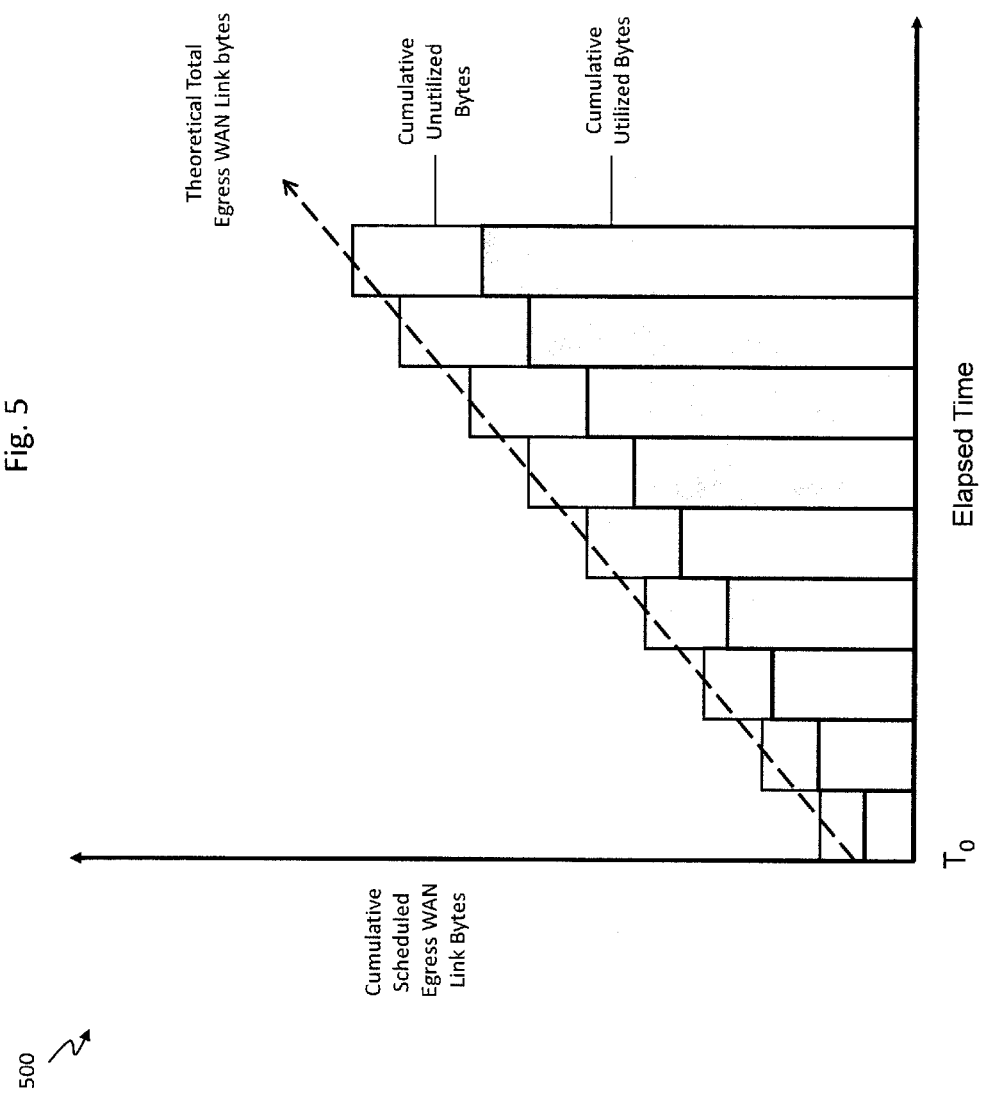
FIG. 5 illustrates the progression of cumulative scheduled Egress WAN link bytes over time, under ideal network conditions according to the present invention.

As illustrated in FIG. 5, in an ideal network the summation of the utilized and unutilized byte counts will add up to a theoretical total of egress WAN link bytes.

Figure 6:
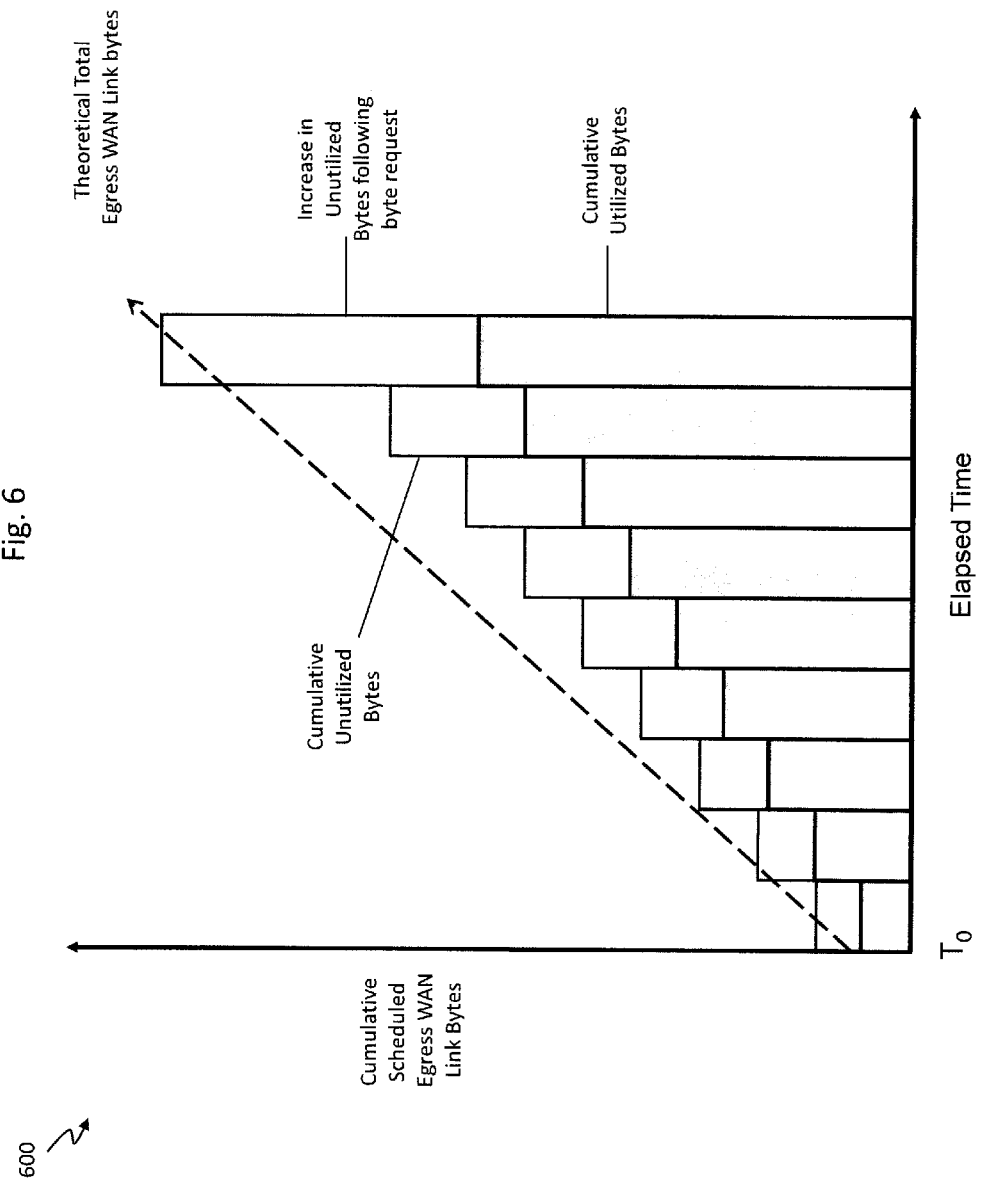
FIG. 6 illustrates the effect of sustained byte deficit on cumulative scheduled Egress WAN link bytes over time according to the present invention.

FIG. 6 illustrates a sustained deficit in the utilized and unutilized byte counts which is a symptom of WAN link congestion. In this scenario, an unutilized byte request is sent by adding a large unutilized byte count to the next packet destined for the Egress WAN link which will cause the scheduler to slow its sending rate and allow the congestion to clear, thus clearing the byte deficit.

Time sensitive flow packets may be directed to bypass a WAN ingress or WAN egress scheduler and go directly to further processing, for example, for transmission or sequencing. This bypass is employed so that these packets are not delayed in the schedulers. In these cases, the packet's impact on the bypassed processing is accounted for by creating a packet shadow that is queued up to the scheduler, representing the bandwidth used by the packet. The packet shadow contains packet data header information that describes the packet as a shadow packet to the scheduler for accounting purposes.

Shadow packets are also used to account for priority packets that bypass the queue. In an embodiment with flow prioritization, when a packet classified as to a high priority flow is received on an APN egress WAN link that is shared with low priority traffic, the high priority packet bypasses any grooming schedules for the egress WAN link and is sent directly out the LAN facing Ethernet Interface send stage 72. The packet's impact on the WAN link is accounted for by creating a packet shadow that is queued up to the egress WAN link grooming scheduler 1300 thereby representing the bandwidth on the WAN link resulting from the packet. The shadow is sent to prevent congestion, because it allows the scheduler to have a more accurate accounting of the bandwidth utilized. Thus, the shadow packets prevent the scheduler from over subscribing the bandwidth, rather than the scheduler having to wait for the control plane to tell it to reduce subscription once the WAN link is over subscribed. In a presently preferred embodiment, packets that can bypass queues include APN conduit packets, quality report packets, and retransmitted packets.

Returning to FIG. 3B, further details of a network configuration are illustrated, including the WAN ingress path processing stage 81 and WAN egress path processing stage 76 according to the present invention. The WAN ingress path processing stage 81 begins when a packet is received from the WAN link scheduling stage 79. The WAN ingress path processing stage 81 then proceeds to step 1100 where data for the send path is retrieved from a send path database (DB) 1110 for the path assigned to this packet using the path selection services previously described. The WAN ingress path processing stage 81 then proceeds to step 1102 where the packet's size is compared to the maximum transmission unit (MTU) and, if the packet size is greater than the MTU, the packet is fragmented into two or more packets and each packet is tagged with a fragmentation header. Following fragmentation, the WAN ingress path processing stage 81 proceeds to step 1104 where a path-specific sequence number is assigned and each packet is time stamped with the current APN network time. At step 1106, each packet is tagged with further path specific data which includes the more-to-come flag indicating whether the WAN egress path processing stage 76 should expect another packet within one control cycle, as well as the unique receive path index that will allow the WAN egress path processing stage 76 to identify which path it will be received on. The WAN ingress path processing stage 81 continues to step 1108 where a copy of the packet is created if the packet belongs to an APN flow with the reliable flow requirement, and the copy is stored in a path packet retransmission DB 566. Finally, the WAN ingress path processing stage 81 forwards a packet to the WAN facing Ethernet send stage 83.

As FIG. 3B illustrates, the WAN egress path processing stage 76 begins when a packet is received from the WAN facing Ethernet receive stage 78. The WAN egress path processing stage 81 then proceeds to decision step 1120, where it is determined whether a packet is encapsulated by examining the packet headers.

If a packet is determined to not be encapsulated, the packet is not from the conduit service. Thus, the WAN egress path processing stage 76 is not required and the packet is forwarded to the egress flow processing stage 70.

Returning to decision step 1120, if a packet is determined to be encapsulated, the WAN egress path processing stage 76 proceeds to decision step 1122 where it is determined whether or not the packet is an APN clock sync control packet.

If a packet is determined to be an APN clock sync control packet it is forwarded to the APN clock sync server 54 on an APN control point, or APN clock sync client 55 on an APN Client node, so the APN time synchronization services previously described can be performed.

Returning to decision step 1122, if the packet is not an APN time sync control packet the WAN egress path processing stage 76 proceeds to decision step 1124 where it is determined if the packet is an APN control message.

If it is determined that the packet is not an APN control message, the WAN egress path processing stage 76 proceeds to step 1126 for path tag extraction.

Returning to decision step 1124, if the packet is determined to be an APN control message, the WAN egress path processing stage 76 proceeds to the control message processing stage 93. Once the control message processing stage 93 has finished processing the packet it proceeds to step 1126 for path tag extraction.

At step 1126, the path tag is retrieved including the more-to-come flag and the receive path index which is used at step 1128 to retrieve the receive path data from the receive path DB 1130 for the specific path the packet was received on. With the receive path data retrieved, the WAN egress path processing stage 76 continues to the path state monitoring module 91 and WAN link accounting module 89, updating path performance and WAN link congestion statistics as previously described. Additionally, a shadow packet representing this packet is forwarded to the egress WAN link grooming stage 74.

The WAN egress path processing stage 76 then continues to a reliable processing module 1136 which determines if a packet belongs to an APN flow with the reliable flow requirement and, if so, marks this sequence number as successfully received. If this is the sixty-fourth contiguous packet received, a SACK message is generated and sent to the WAN egress processor module 132 of the other APN appliance in this conduit indicating the packets have been received. If the sequence number is not the expected sequence number, a SNACK packet is sent to the WAN egress processor module 132 of the other APN appliance in the conduit, indicating all the packets received successfully up to this point including this packet as well as which packets were not received.

The WAN egress path processing stage 76 continues to decision step 1134 where it is determined if a packet is an APN control message packet. If it is determined that a packet is an APN control message packet, the packet is discarded at step 1132 as the packet contains no user data intended to be sent to the LAN.

Returning to decision step 1134, if a packet is not determined to be an APN control message, the WAN egress path processing stage 76 is finished and the packet is forwarded to the egress flow processing stage 70.

While the present invention has been disclosed in the context of various aspects of presently preferred embodiments, it will be recognized that the invention may be suitably applied to other environments consistent with the claims which follow.

We claim:

1. A method for path selection within a network utilizing characterizations of multiple communication paths within the network which vary in transmission behavior across the network, the method comprising:
   determining a packet for a communication session was previously routed on a one way transmission across a selected first path within the network from a source node to a destination node in accordance with a flow record comprising a measured transmit time at the source node and an arrival time at the destination node for the one way transmission across the selected first path, wherein the packet is a member of a set of sequenced packets tagged for transmission; and
   adding a configurable impedance to a queuing time for subsequent packets of the set of sequenced packets to be transmitted from the source node to the destination node across the selected first path prior to switching to a second path within the network from the source node to the destination node.

2. The method of claim 1, wherein the flow record comprises information pertaining to the selected first path, the measured arrival and transmit times for the one way transmission across the selected first path based on a network node time calibrated to a master clock in a coupled administration point external to nodes in the network, and historical and current path information.

3. The method of claim 1 further comprising:
   selecting a best available path if no prior path was previously selected.

4. The method of claim 1 further comprising:
   selecting a load balancing impedance value for the configurable impedance to promote efficient load balancing of the communication session, wherein packets have an increased likelihood of arriving in order at the destination node.

5. The method of claim 1, wherein the configurable impedance is not added to the queuing time for the subsequent packets having high bandwidth streaming data.

6. The method of claim 1, wherein the flow record further comprises the configurable impedance.

7. The method of claim 6, wherein the flow record further comprises a mean value of wide area network jitter and a latency penalty.

8. The method of claim 1, wherein the transmit time at the source node and the arrival time at the destination node are measured according to a calibrated network node time, the network node time calibrated in each node of the network to a master clock in one of the nodes of the network selected as a network control point.

9. A method for path selection in nodes of a network utilizing characterizations of multiple communication paths which vary in transmission behavior across the network, the method comprising:
   determining a packet for a communication session was previously routed across a selected path to a destination node in accordance with a flow record, wherein the packet is a member of a set of sequenced packets tagged for transmission;
   adding a configurable impedance to a queuing time for subsequent packets of the set of sequenced packets to be transmitted to the destination node across the selected path prior to switching to a different path to the destination node; and
   selecting a persistence impedance value for the configurable impedance to bound the packets to the selected path as a single persistent path for the communication session.

10. The method of claim 9, wherein the destination node requires fewer instances of holding received packets of the set of sequenced packets for reordering.

11. A method for path selection in nodes of a network utilizing characterizations of multiple communication paths which vary in transmission behavior across the network, the method comprising:
   determining a packet for a communication session was previously routed across a selected path to a destination node in accordance with a flow record, wherein the packet is a member of a set of sequenced packets tagged for transmission; and
   adding a configurable impedance to a queuing time for subsequent packets of the set of sequenced packets to be transmitted to the destination node across the selected path prior to switching to a different path to the destination node, wherein a single persistent path to a peer node is selected while allowing for adaptation by re-selection to a different path if characterizations of the single persistent path change in a way that would cause disruption to the communication session.

12. The method of claim 11, wherein packets for the communication session are each tagged with a high resolution time stamp in each node based on a network node time calibrated in each node to a master clock in an external administration point remote from each node.

13. The method of claim 12, wherein communication time between a source node and the destination node is calculated based on the calibrated network node time.

14. A computer readable non-transitory medium storing a computer program which causes a computer system to perform a method for path selection within a network, the method comprising:
   determining a packet for a communication session was previously routed on a one way transmission across a selected first path within the network from a source node to a destination node in accordance with a flow record comprising a measured transmit time at the source node and an arrival time at the destination node for the one way transmission across the selected first path, wherein the packet is a member of a set of sequenced packets tagged for transmission; and adding a configurable impedance to a queuing time for subsequent packets of the set of sequenced packets to be transmitted from the source node to the destination node across the selected first path prior to switching to a second path within the network from the source node to the destination node.

15. The method of claim 14 further comprising:

selecting a load balancing impedance value for the configurable impedance to promote efficient load balancing of the communication session, wherein packets have an increased likelihood of arriving in order at the destination node.

16. The method of claim 14 further comprising:

selecting a persistence impedance value for the configurable impedance to bound the packets to the selected path as a single persistent path for the communication session.

17. The method of claim 14, wherein the destination node requires fewer instances of holding received packets of the set of sequenced packets for reordering.

18. The method of claim 14, wherein a single persistent path to a peer node is selected while allowing for adaptation by re-selection to a different path if characterizations of the single persistent path change in a way that would cause disruption to the communication session.

19. The method of claim 14, wherein packets for the communication session are each tagged with a high resolution time stamp in the source node and the destination node based on a calibrated network node time in each node of the network, the network node time calibrated to a master clock in an external administration point remote from each node.

20. The method of claim 14, wherein the transmit time at the source node and the arrival time at the destination node are measured according to a calibrated network node time, the network node time calibrated in each node of the network to a master clock in a network administration point separate from each node of the network.

* * * * *